United States Patent
Hirano et al.

(10) Patent No.: US 10,564,370 B2
(45) Date of Patent: Feb. 18, 2020

(54) OPTICAL CONNECTING DEVICE, LIGHT PROCESSING APPARATUS, METHOD FOR FABRICATING OPTICAL CONNECTING DEVICE

(71) Applicant: SUMITOMO ELECTRIC INDUSTRIES, LTD., Osaka (JP)

(72) Inventors: Mitsuharu Hirano, Osaka (JP); Akira Furuya, Osaka (JP); Koichi Koyama, Osaka (JP); Masahiro Shibata, Yokohama (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 16/017,573

(22) Filed: Jun. 25, 2018

(65) Prior Publication Data
US 2018/0372970 A1    Dec. 27, 2018

(30) Foreign Application Priority Data
Jun. 26, 2017 (JP) .................. 2017-124518

(51) Int. Cl.
*G02B 6/38* (2006.01)
*G02B 6/42* (2006.01)

(52) U.S. Cl.
CPC ......... *G02B 6/3897* (2013.01); *G02B 6/3898* (2013.01); *G02B 6/421* (2013.01); *G02B 6/4292* (2013.01); *G02B 6/4231* (2013.01)

(58) Field of Classification Search
None
See application file for complete search history.

(56) References Cited

U.S. PATENT DOCUMENTS

| 6,243,518 B1* | 6/2001 | Lee | G02B 6/3839 |
| | | | 385/54 |
| 2017/0097482 A1* | 4/2017 | Furuya | G02B 6/30 |

FOREIGN PATENT DOCUMENTS

JP    8-160242    6/1996

* cited by examiner

*Primary Examiner* — Jerry Rahll
(74) *Attorney, Agent, or Firm* — Smith, Gambrell & Russell, LLP.

(57) ABSTRACT

A method for fabricating an optical connecting device with a holder having a through hole, multiple optical fibers, a guide member, and a resin body includes steps of: preparing optical-fiber parts to provide the multiple optical fibers; preparing first and second parts to provide the holder, the first and second parts having grooves for providing the through hole of the holder; fixing the parts providing the holder and the optical-fiber parts to each other to form a first product having the through hole produced from the grooves; providing an optical connector tool; positioning a component of the tool in the through hole of the first product to provide the guide member; and thereafter, fixing the component in the through hole with resin to form a second product in which the resin provides the resin body.

4 Claims, 16 Drawing Sheets

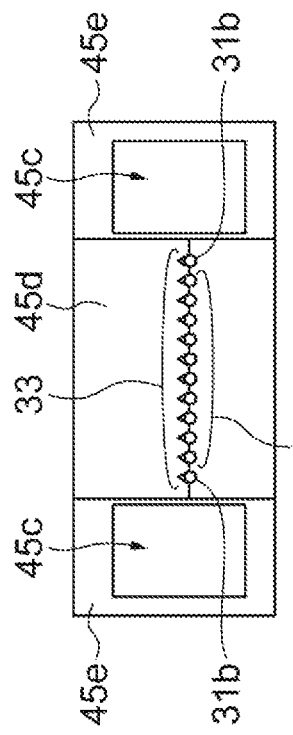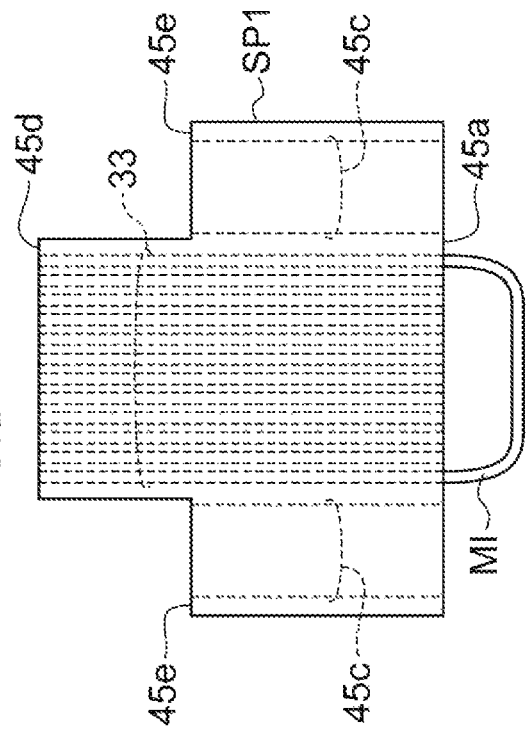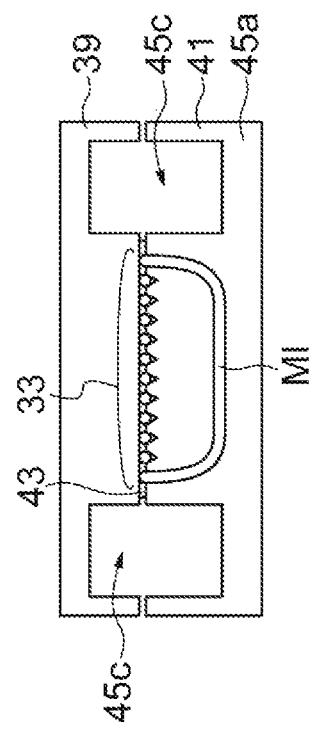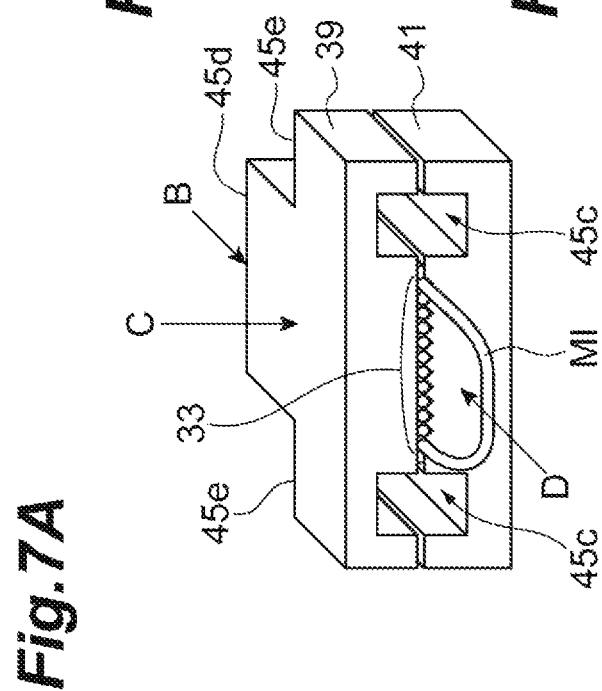

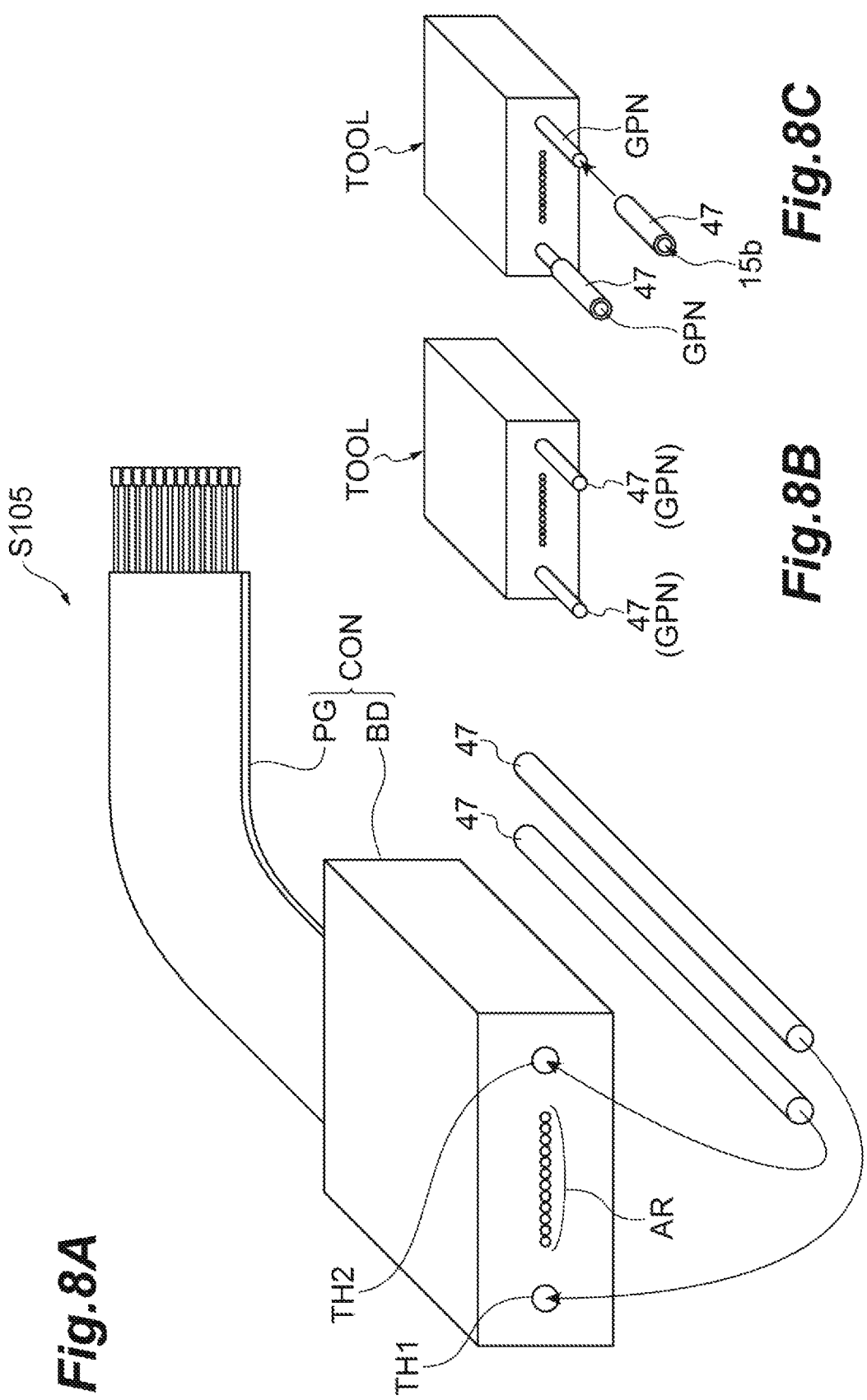

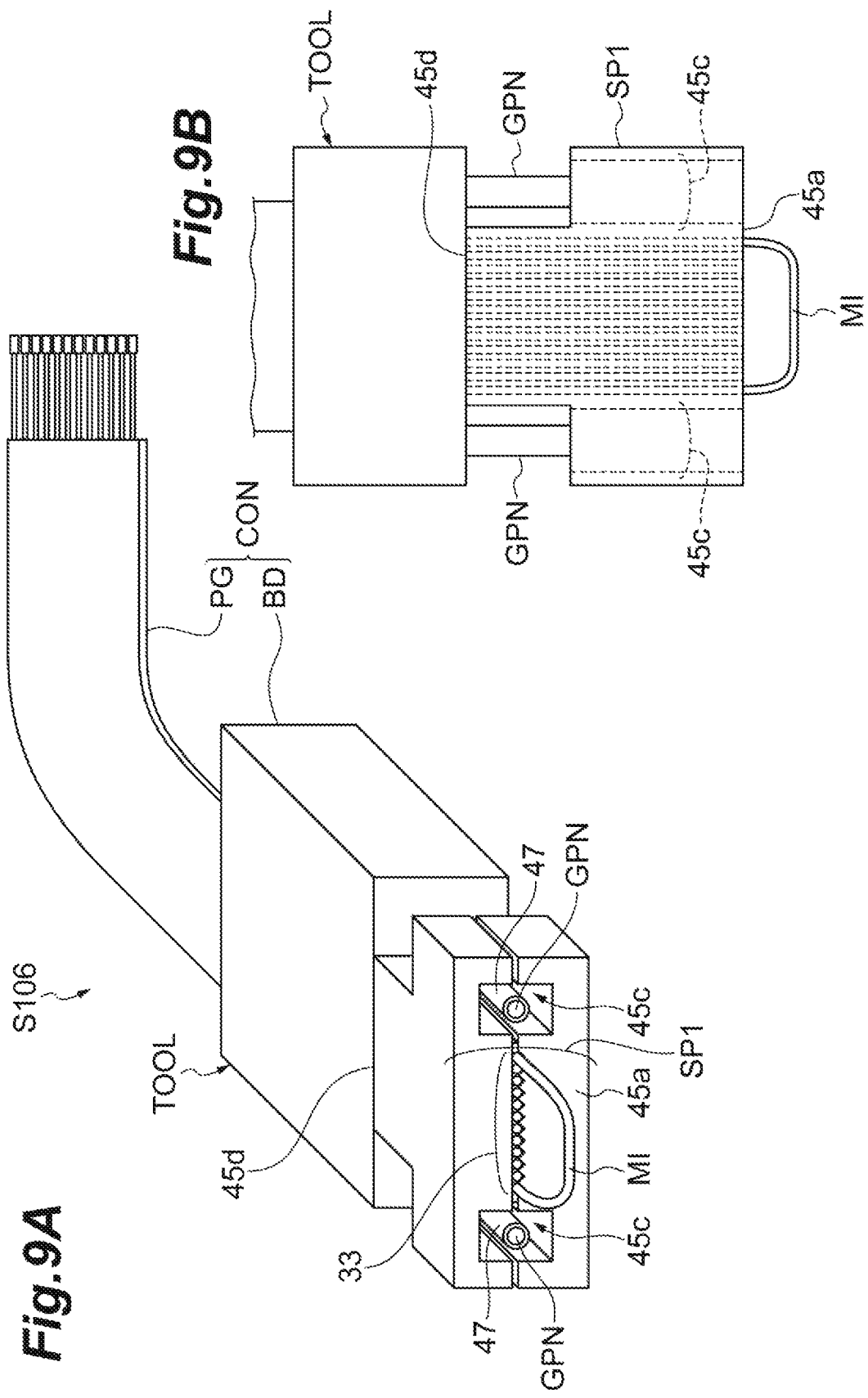

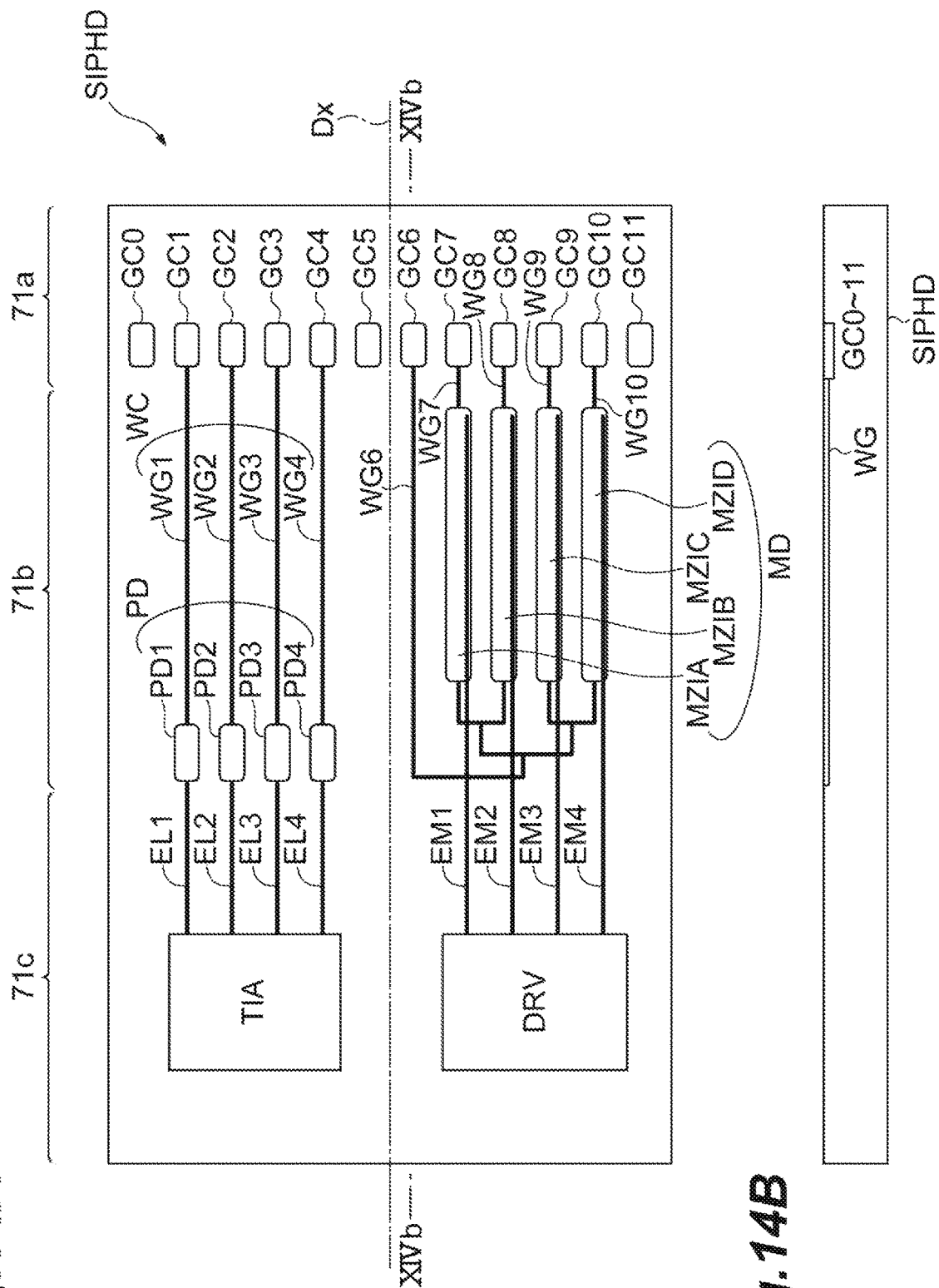

OPTICAL CONNECTING DEVICE, LIGHT PROCESSING APPARATUS, METHOD FOR FABRICATING OPTICAL CONNECTING DEVICE

BACKGROUND OF THE INVENTION

Field of the Invention

The present invention relates to an optical connecting device, a light processing apparatus, and a method for fabricating an optical connecting device. This application claims the benefit of priority from Japanese Patent application No. 2017-124518 filed on Jun. 26, 2017, which is herein incorporated by reference in its entirety.

Related Background Art

Japanese Unexamined Patent Publication No. 08-160242, referred to hereinafter as Patent Document 1, discloses an optical fiber array that can be directly connected to an optical connector, such as an MT connector and an MPO connector.

SUMMARY OF THE INVENTION

An optical connecting device according to one aspect of the present invention includes: a holder having a first end, a second end, and a through hole extending in a direction of a first axis from one of the first end and the second end to the other; multiple optical fibers held by the holder; a guide member extending in the through hole; and a resin body separating an outer face of the guide member from an inner face of the through hole.

An optical processing apparatus according to another aspect of the present invention includes: an optical connecting device; a silicon photonics semiconductor device mounting the optical connecting device; a semiconductor device connected to the silicon photonics semiconductor device; and a circuit board mounting the silicon photonics semiconductor device and the semiconductor device. The optical connecting device includes: a holder having a first end, a second end, and a through hole extending in a direction of a first axis from one of the first end and the second end to the other; multiple optical fibers held by the holder; a guide member extending in the through hole; and a resin body separating an outer face of the guide member from an inner face of the through hole.

A method for fabricating an optical connecting device according to further aspect of the present invention includes steps of: preparing a first optical-fiber part, a second optical-fiber part, a first part, and a second part, the first part having a first groove for a through hole, and the second part having a second groove for the through hole; fixing the first part, the second part, the first optical-fiber part and the second optical-fiber part to each other to form a first product having the through hole produced from the first groove and the second groove, the first optical-fiber part and the second optical-fiber part being disposed between the first part and the second part; preparing an optical connector tool including an optical connector having a first optical waveguide and a second optical waveguide, and a inserting component attached to the optical connector; positioning the inserting component of the optical connector tool in the through hole to the first product; and after positioning the inserting component, fixing the inserting component to the through hole with resin to form a second product.

BRIEF DESCRIPTION OF THE DRAWINGS

The above-described objects and the other objects, features, and advantages of the present invention become more apparent from the following detailed description of the preferred embodiments of the present invention proceeding with reference to the attached drawings.

FIG. 7A is a schematic view showing a major step in the method according to the present embodiment.

FIG. 7B is a schematic view showing a major step in the method according to the present embodiment.

FIG. 7C is a schematic view showing a major step in the method according to the present embodiment.

FIG. 7D is a schematic view showing a major step in the method according to the present embodiment.

FIG. 8A is a schematic view showing a major step in the method according to the present embodiment.

FIG. 8B is a schematic view showing a major step in the method according to the present embodiment.

FIG. 8C is a schematic view showing a major step in the method according to the present embodiment.

FIG. 9A is a schematic view showing a major step in the method according to the present embodiment.

FIG. 9B is a schematic view showing a major step in the method according to the present embodiment.

FIG. 14A is a schematic view showing a major step in the method according to the present embodiment.

FIG. 14B is a schematic view showing a major step in the method according to the present embodiment.

DESCRIPTION OF THE EMBODIMENTS

Figure 1:
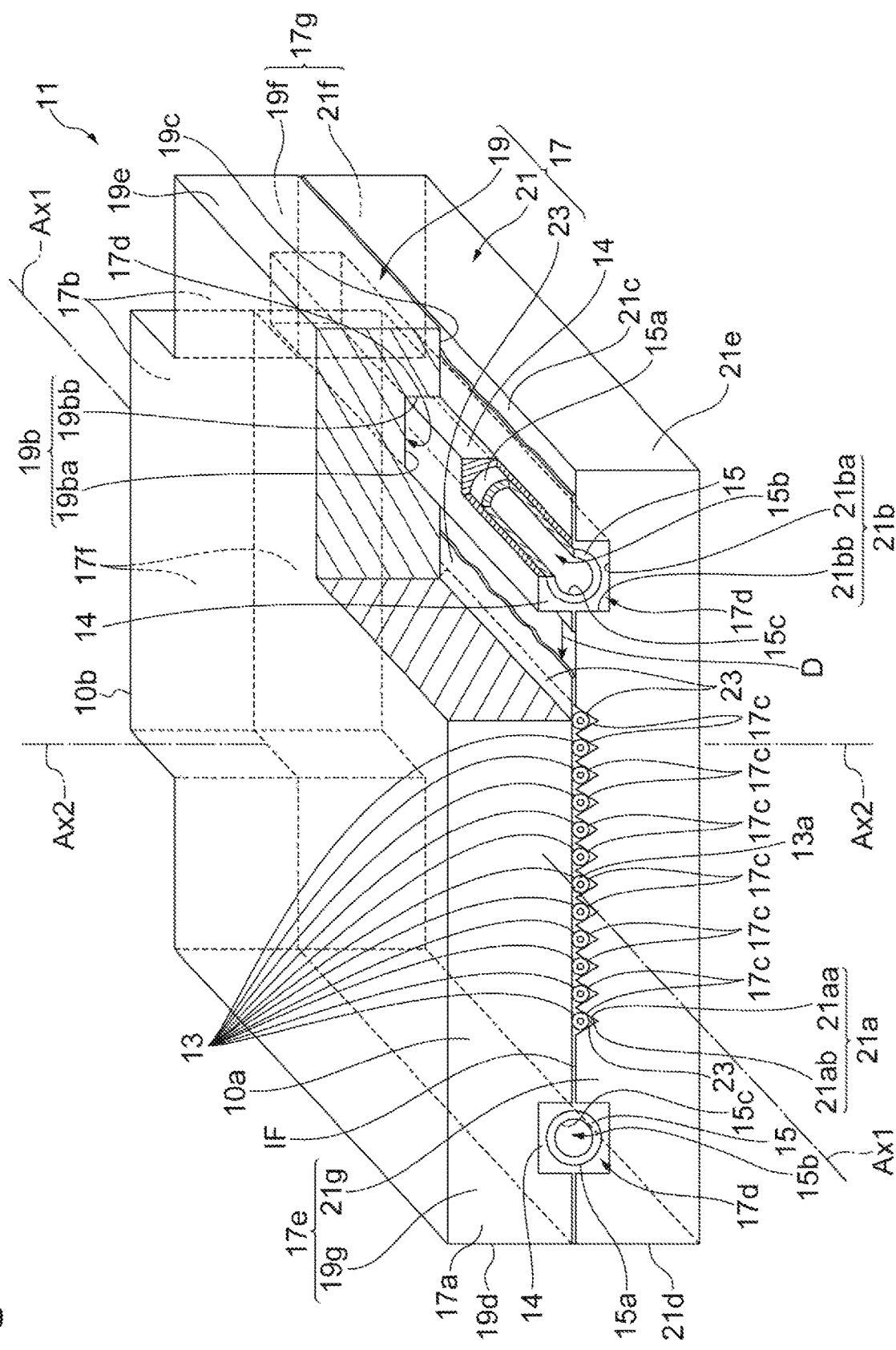
FIG. 1 is a schematic perspective view showing an optical connecting device according to the present embodiment.

An optical connecting device, such as an optical fiber array, can be used to be connected to an optical connector. The inventor's findings show that providing the optical connecting device with a superior thermal resistance may actualize, in addition to known applications, such as connection to an optical connector, other applications, such as connection with a semiconductor device.

It is an object of one aspect of the present invention to provide an optical connecting device having a structure that can prevent one of thermal deformations of the holder thereof and the guide member thereof from directly affecting the other. It is an object of another aspect of the present invention to provide a light processing apparatus that includes the optical connecting device. It is an object of a further aspect of the present invention to provide a method for fabricating the optical connecting device.

A description will be given of embodiments according to the present above aspects.

An optical connecting device according to an embodiment includes: (a) a holder having a first end, a second end, and a through hole extending in a direction of a first axis from one of the first end and the second end to the other; (b) multiple optical fibers held by the holder; (c) a guide member extending in the through hole; and (d) a resin body separating an outer face of the guide member from an inner face of the through hole.

The optical connecting device allows the resin body to cover the outer face of the guide member by extending in a direction from one end of the through hole to the other end, so that the resin body separates the outer face of the guide member from the inner face of the through hole of the holder over the through hole. This resin body extends annularly along the outer face of the guide member to form an annular closed shape on a cross section orthogonal to the first axis. This resin coating can separate the inner face of the through hole from the outer face of the guide member. Variations in temperature of the holder deform the guide member and the holder, and the resin body between the inner face of the through hole and the outer face of the guide member can prevent one of the guide member and through hole thus deformed from making direct contact with each other.

In the optical connecting device according to an embodiment, the first end has a first end face extending along a first reference plane intersecting the first axis, and the multiple optical fibers and the guide member extend from the first end face in the direction of the first axis.

The optical connecting device provides the first end face for optical coupling.

In the optical connecting device according to an embodiment, the inner face of the through hole has multiple side faces extending from the first end in the direction of the first axis, and each of the multiple side faces of the through hole is apart from the outer face of the guide member.

The optical connecting device allows the through hole to have multiple side faces extending from the first end of the holder in the direction of the first axis. The resin body is guided by each of the side faces of the through hole so as to extend in the direction of the first axis, and separates the side faces from the outer face of the guide member.

In the optical connecting device according to an embodiment, the optical connecting device includes a stub-type connector having the holder, the multiple optical fibers, the guide member, and the resin body.

In the optical connecting device, the stub-type connector does not include a pigtail fiber. No pigtail fiber can prevent the stub-type connector from suffering from complications in handling an optical processing apparatus that includes the stub-type connector and an optical device connected thereto.

An optical processing apparatus according to an embodiment comprises: (a) an optical connecting device; (b) a silicon photonics semiconductor device mounting the optical connecting device; (c) a semiconductor device connected to the silicon photonics semiconductor device; and (d) a circuit board mounting the silicon photonics semiconductor device and the semiconductor device. The optical connecting device includes: a holder having a first end, a second end, and a through hole extending in a direction of a first axis from one of the first end and the second end to the other; multiple optical fibers held by the holder; a guide member extending in the through hole; and a resin body separating an outer face of the guide member from an inner face of the through hole.

The optical processing apparatus optically couples the optical connecting device to the silicon photonics device, and makes this optical coupling easy. The optical connecting device is provided with the structure that can withstand thermal stresses applied thereto in being mounted on the silicon photonics device.

A method for fabricating an optical connecting device according to an embodiment includes: steps of: (a) preparing a first optical-fiber part, a second optical-fiber part, a first part, and a second part, the first part having a first groove for a through hole, and the second part having a second groove for the through hole; (b) fixing the first part, the second part, the first optical-fiber part and the second optical-fiber part to each other to form a first product having the through hole produced from the first groove and the second groove, the first optical-fiber part and the second optical-fiber part being disposed between the first part and the second part; (c) preparing an optical connector tool including an optical connector having a first optical waveguide and a second optical waveguide, and an inserting component attached to the optical connector; (d) positioning the inserting component of the optical connector tool in the through hole to the first product; and (e) after positioning the inserting component, fixing the inserting component to the through hole with resin to form a second product.

The method for fabricating the optical connecting device positions the inserting component in the through hole without the inserting component being supported by the side face of the through hole, and the position of the inserting component is determined independently of the inner face of the through hole. The inserting component that is fixed in the through hole with resin can be used to optically couple the optical connecting device to a connector, and is apart from the inner face of the through hole. Isolating the inserting component from the through hole can prevent thermal stress of one of the insertion component and the holder, which is produced from the first part and the second part, from being transferred directly to the other.

In the method according to an embodiment, the first optical-fiber part having one end portion, another end portion, and an intermediate portion connecting the one end portion to the other end portion; the first optical-fiber part and the second optical-fiber part has a first length and a second length larger than the first length, respectively; in the step of fixing the first part, the second part, the first optical-fiber part and the second optical-fiber part to each other, the first optical-fiber part and the second optical-fiber part are arranged between the first part and the second part such that the one end portion and the other end portion are disposed between the first part and the second part and the intermediate portion are disposed outside of the first part and the second part; and the step of positioning the inserting component includes conducting an active alignment such that the one end portion and the other end portion in the first product are optically coupled to the first optical waveguide and the second optical waveguide, respectively.

The above method conducts active alignment to position the inserting component, which has been attached to the optical connector, in the through hole of the first product. The inserting component is positioned between the first part and the second part independently of the sides and/or bottoms of the first and second grooves of the first and second parts. The side of the inserting component is covered with resin in the positioning step.

The method according to an embodiment further includes a step of machining the second optical-fiber part to remove the intermediate portion from the second optical-fiber part such that the one end portion and the other end portion are left between the first part and the second part.

In the above method, machining the second optical-fiber part to remove the intermediate portion thereof can provide the optical connecting device with the optical coupling end.

The method according to an embodiment further comprises a step of removing the optical connector from the second product.

The method for making an optical connecting device uses the optical connector of the optical connector tool that is pluggable thereto.

Teachings of the present invention can be readily understood by considering the following detailed description with reference to the accompanying drawings shown as examples. Referring to the accompanying drawings, an optical connecting device, a light processing apparatus, and a method for fabricating an optical connecting device according to embodiments of the present invention will be described below. To facilitate understanding, identical reference numerals are used, where possible, to designate identical elements that are common to the figures.

FIG. 1 is a partially cutaway perspective view showing an optical connecting device according to the present embodiment. The optical connecting device 11 includes one or more optical fibers 13, a first resin body 14, a guide member 15, and a holder 17. Each of the optical fibers 13 forms an optical waveguide, and is held by the holder 17 so as to extend in a direction of a first axis Ax1. The holder 17 has a first end 17a, a second end 17b, one or more supporting portions 17c, and a through hole 17d. The second end 17b is opposite to the first end 17a. The through hole 17d extends in the direction of the first axis Ax1 from one of the first end 17a and the second end 17b to the other. Each of the optical fibers 13 has one end 13a at the first end 17a of the holder 17. The guide member 15 extends along the through hole 17d of the holder 17. The first resin body 14 separates the inner face of the through hole 17d from the outer face 15a of the guide member 15 in a radial direction of the guide member 15, and in the present embodiment, the guide member 15 is covered with the first resin body 14 on the outer face 15a ranging from one end of the through hole 17d to the other end. The supporting portions 17c support the optical fibers 13, and extend toward the second end 17b from the first end 17a. In the present embodiment, each of the supporting portions 17c extends from the first end 17a to the second end 17b. In order to support the optical fibers 13, the supporting portion 17c may have a through hole with at least three supporting faces. In the present embodiment, these supporting faces are in contact with the side face of the optical fiber 13.

The optical connecting device 11 allows the resin body 14 to extend from one end of the through hole 17d to the other end in the longitudinal direction of the through hole 17d so as to cover the guide member 15 over the outer face 15a thereof, so that the resin body 14 separates the guide member 15 from the through hole 17d of the holder 17. The resin body 14 further extends annularly along the outer face of the guide member 15 to form an annular closed shape on a cross section orthogonal to the first axis Ax1. This resin coating can separate the inner face of the through hole 17d from the outer face of the guide member 15 over the through hole 17d. Variations in temperature of the holder 17 deform the guide member 17 and the holder 17, and the resin body 14 that fills between the inner face of the through hole 17d and the outer face of the guide member 15 can prevent one of the guide member 15 and the through hole 17d thus deformed from making direct contact with each other.

In the optical connecting device 11, the first end 17a of the holder 17 has a first end face 17e, and the first end face 17e extends along a first reference plane intersecting the first axis Ax1. The optical fibers 13 and the guide member 15 extend from the first end 17a of the holder 17. The optical connecting device 11 can be provided with the first end face 17e for optical coupling between the optical connecting device 11 and an external device. The second end 17b of the holder 17 has a second end face 17f, which extends along a second reference plane intersecting the first axis Ax1. In the present embodiment, the through hole 17d extends from the first end face 17e to the rear end face 17g, which is recessed from the second end face 17f in the direction from the second end 17b to the first end 17a, and a distance between the second end face 17f and the rear end face 17g can be, for example, 300 to 3000 micrometers. If necessary, the holder 17 may not be provided with the rear end face 17g in the holder 17, and allows both the supporting portions 17c and the through hole 17d to extend from the first end face 17e to the second end face 17f.

In the optical connecting device 11, the inner face of the through hole 17d includes multiple side faces, which extend from the first end 17a in the direction of the first axis Ax1. The through hole 17d, specifically a space between the inner face of the through hole 17d and the outer face 15a of the guide member 15, is filled with the first resin body 14. The first resin body 14 extends from the first end 17a of the holder 17 along the inner face of the through hole 17d in the direction of the first axis Ax1, and can separate the inner face of the through hole 17d from the guide member 15 in the direction normal to the outer face 15a of the guide member 15.

The through hole 17d receives both the guide member 15 and the first resin body 14 therein such that the outer face 15a of the guide member 15 is apart from the inner face of the through hole 17d. The first resin body 14 is positioned between the outer face 15a of the guide member 15 and the inner side face of the through hole 17d so as to prevent the guide member 15 from making direct contact with the inner face of the through hole 17d. The first resin body 14 has a thickness of 10 micrometers or more on the outer face 15a of the guide member 15 in the through hole 17d, where this thickness is defined in the direction normal to the outer face 15a of the guide member 15. The guide member 15 and the through hole 17d have an outer dimension and an inner dimension larger than the outer dimension of the guide member 15, respectively, and the difference in size prevents the guide member 15 thus positioned in the through hole 17d from making direct contact with the inner side face of the through hole 17d. The first resin body 14 is made of material, for example, an epoxy-based, acrylate-based, or silicone-based material. The through hole 17d has a sectional shape as shown in FIG. 1, and may have another sectional shape.

The guide member 15 can include either a guide pin or a guide pipe. In the present embodiment, the guide member 15 includes a guide pipe having a guide hole 15b, which is defined by an inner side face 15c extending in the direction of the first axis Ax1. The guide member 15 can be made of metal, and the metal includes, for example, copper, nickel, iron, cobalt, tungsten or an alloy containing them.

The optical connecting device 11 has one end face 10a and another end face 10b. The optical connecting device 11 can be provided with the one end face 10a that is fixed to another optical device by adhesive for optical connection. The through hole 17d extends in the direction of the first axis Ax1 from the one end face 10a. As shown in FIG. 1, the optical connecting device 11 may include a stub device, and the stub device includes the optical fibers 13, the first resin body 14, the guide member 15, and the holder 17. The stub device includes no pigtail fiber. In the stub-type optical connecting device 11, the one end face 10a and the other end face 10b are ready for optical connection.

The holder 17 can include a first member 19, a second member 21, and a second resin body (referred to hereinafter as an adhesive member 23). The adhesive member 23 bonds the first and second members 19 and 21 to each other. As understood from the description of the method of making the optical connecting device 11, adhesive resin is solidified in a process different from that of the first resin body 14 to form the adhesive member 23. The adhesive member 23 may be spaced apart from the first resin body 14 by a distance D, and alternatively, may make contact with the first resin body 14 to form an interface IF. The first resin body 14 includes a material of, for example, an epoxy-based, acrylate-based, or silicone-based material. The holder 17 has dimensions (specifically, length, width and height) of, for example, several millimeters.

The optical fibers 13 are positioned between the first and second members 19 and 21 by the supporting portion 17c, and are firmly fixed to the holder 17 with the adhesive member 23. The holder 17 adheres to the optical fibers 13 with the adhesive member 23 to hold the optical fibers 13. The optical fibers 13 each may include, for example, a quartz single mode optical fiber, and the optical fiber 13 has a core and a cladding around the core.

Figure 2:
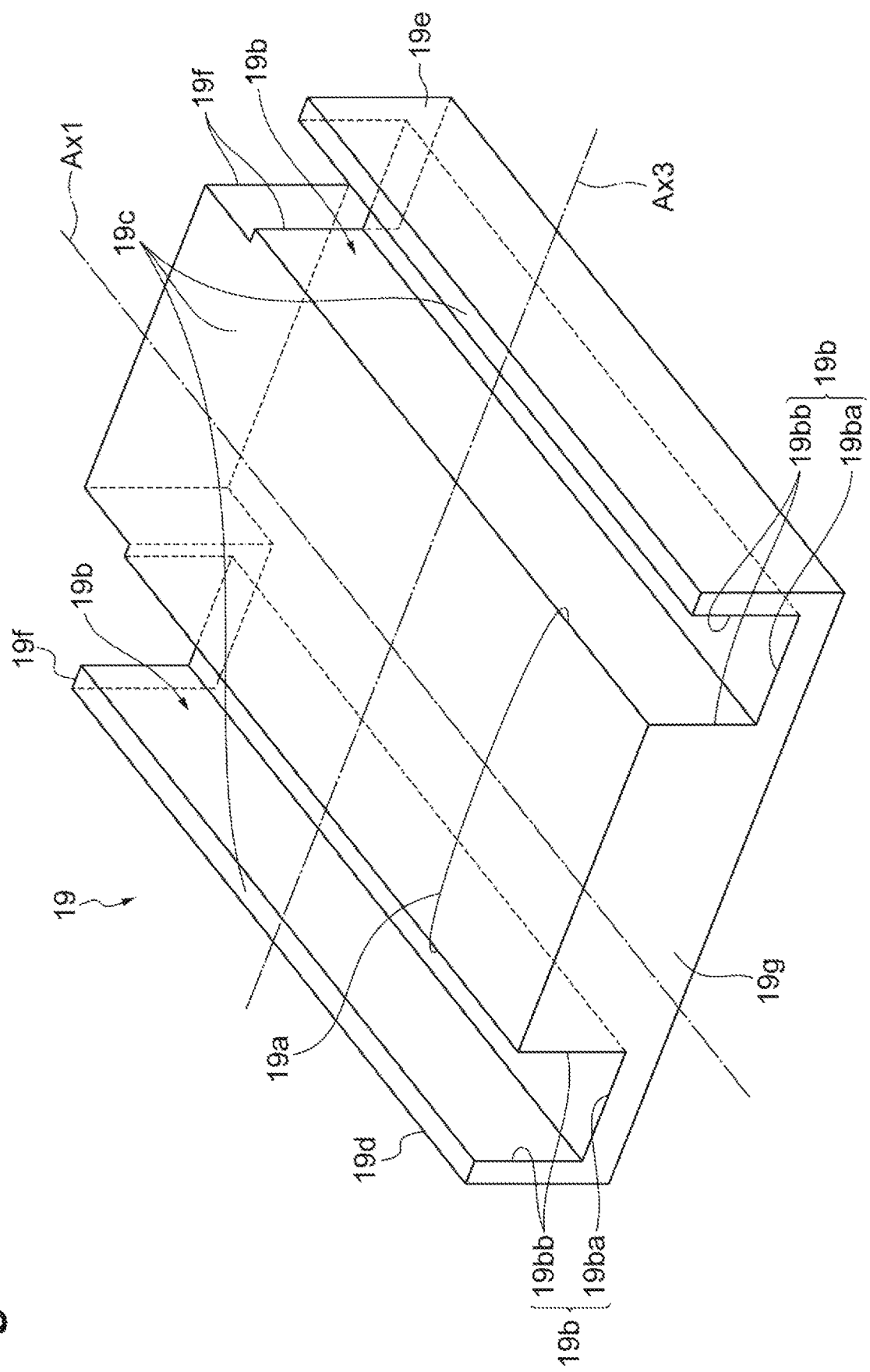
FIG. 2 is a schematic perspective view showing a first member of the optical connecting device according to the embodiment.
Figure 3:
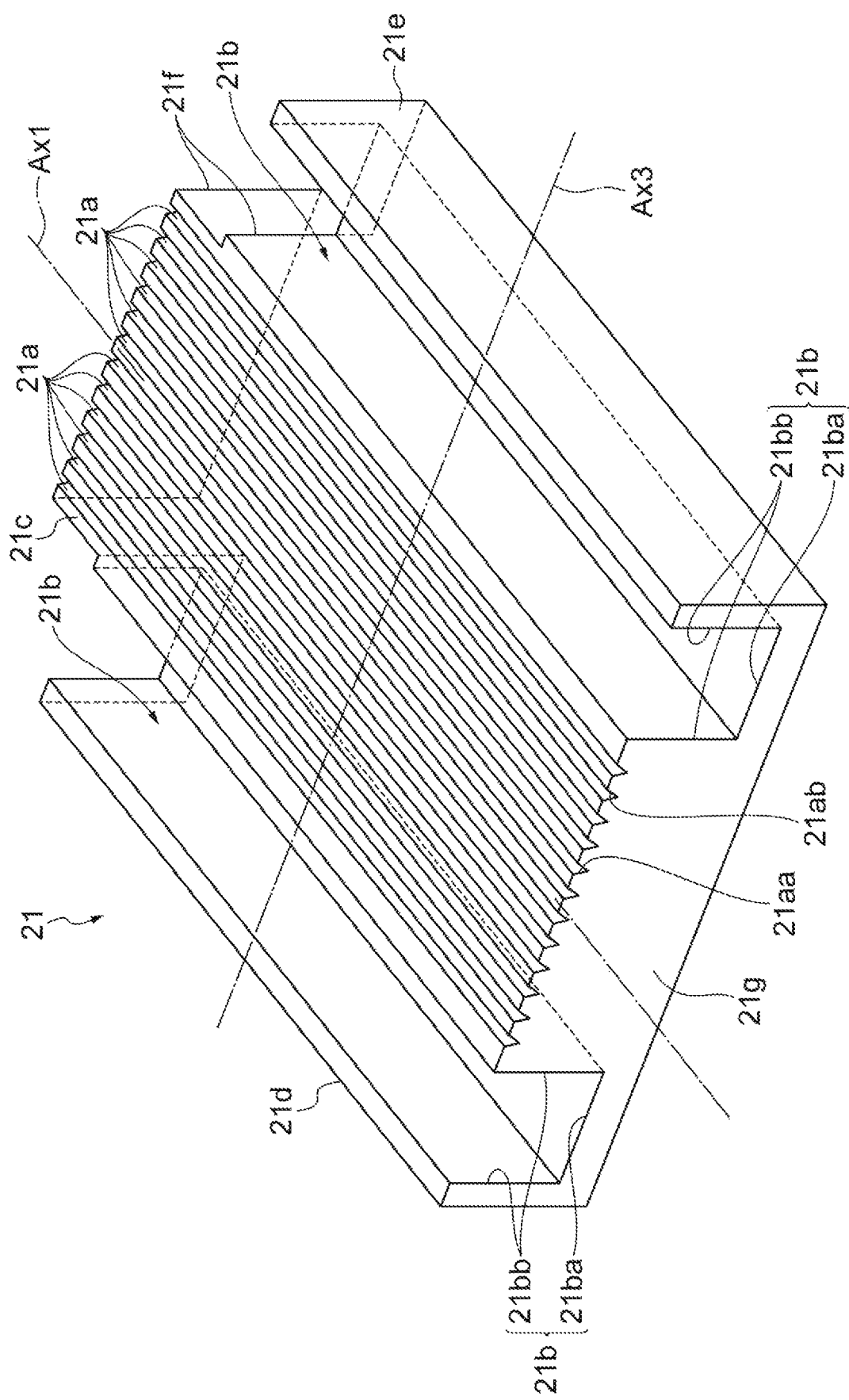
FIG. 3 is a schematic perspective view showing a second member of the optical connecting device according to the embodiment.

The first and second members 19 and 21 will be described with reference to FIGS. 1, 2 and 3. In the present embodiment, the first member 19 has a first supporting portion 19a with a substantially flat support face 19c, which can support the optical fibers 13. The second member 21 has multiple second supporting portions 21a, each of which has a first side face 21aa and a second side face 21ab which can support the optical fiber 13. In the present embodiment, the support face 19c and the first and second side faces 21aa and 21ab are in direct contact with the side face of the optical fiber 13 at a part of each of these faces, and another part thereof supports the side face of the optical fiber 13 with the adhesive member 23 disposed therebetween.

In the present embodiment, the first member 19 includes a first receptacle portion 19b having one or more side faces, specifically the first and second side faces 19ba and 19bb in the embodiment, forming the receptacle that can receive the guide member 15 and the first resin body 14 therein. All of the first and second side faces 19ba and 19bb are apart from the guide member 15, and the first and second side faces 19ba and 19bb are covered with the adhesive member 23. The first receptacle portion 19b is not limited to the specific shape shown in FIG. 2. The second member 21 includes a second receptacle portion 21b having one or more side faces, specifically, the first and second side faces 21ba and 21bb in the embodiment, thereby forming the receptacle that can receive the guide member 15 and the first resin body 14 therein. All of the first and second side faces 21ba and 21bb are apart from the guide member 15, and the first and second side face 21ba and 21bb are covered with the adhesive member 23. The second receptacle portion 21b is not limited to the specific shape shown in FIG. 3.

The optical connecting device 11 can position the guide member 15 between first and second members 19 and 21, and the first resin body 14 firmly holds the guide member 15 in the through hole 17d of the holder 17.

The first and second members 19 and 21 each are made of ceramics or glass, such as borosilicate glass or quartz glass. These glass materials and the ceramic material allows the first and second members 19 and 21 each to have accurate dimensions.

The first member 19 supports the second member 20 on the support face 19c with the adhesive member 23 disposed between these members. In the present embodiment, the first receptacle portion 19b is provided on the support face 19c. The support face 19c provides the substantially flat face that can support the optical fibers 13. The support face 19c extends in a direction from one of one side 19d and another side 19e to the other (in the direction of the third axis Ax3 intersecting with the directions of the first and second axes Ax1 and Ax2), and connects the first and second end faces 19f and 19g of the first member 19.

The second member 21 supports the first member 19 on the support face 21c with the adhesive member 23 disposed between these members. In the present embodiment, the second supporting portion 21a and the second receptacle portion 21b are arranged on the support face 21c. The support face 21c extends in a direction from one of one side 21d and another side 21e to the other (in the direction of the third axis Ax3), and connects the first and second end faces 21f and 21g of the second member 21.

FIGS. 4 to 12C are schematic views each showing a major step in the method for fabricating an optical connecting device according to the present embodiment. To facilitate understanding, reference numerals used in the description with reference to FIGS. 1 to 3 will be used in subsequent descriptions, where possible. The method according to the embodiment makes an optical connecting device having twelve optical fibers.

Figure 4:
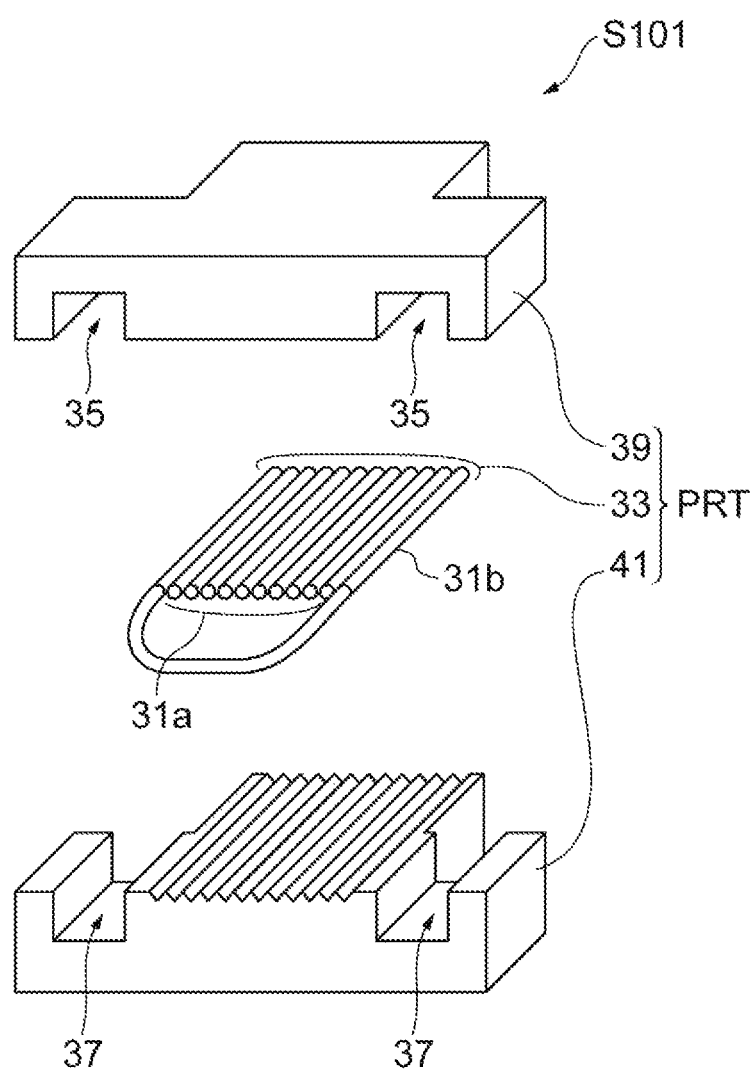
FIG. 4 is a schematic view showing a major step in a method for fabricating the optical connecting device according to the present embodiment.

As shown in FIG. 4, in step S101, a set of parts including an optical fiber part 33, the first part 39 with a first groove 35 for the through hole 17d, and an second part 41 with a second groove 37 for the through hole 17d, is prepared. The first and second parts 39 and 41 are associated with the first and second members 19 and 21 of the optical connecting device 11. The optical fiber part 33 is associated with the optical fibers 13 of the optical connecting device 11. This method does not require the first and second grooves 35 and 37 to satisfy dimensional accuracy necessary for optical coupling of the optical connecting device 11.

In the present embodiment, the optical fiber part 33 includes first optical fiber parts 31a, and in the present embodiment, further includes a second optical fiber part 31b. The first and second optical fiber parts 31a and 31b each have a first length and a second length, respectively. The second length is larger than the first length. Specifically, the length of the second optical fiber part 31b is more than twice the length of each of the first optical fiber parts 31a. The optical fiber part 33 includes a single second optical fiber part 31b and a total of ten first optical fiber parts 31a. The optical fiber part 33 can include a total of twelve first optical fiber parts 31a without using the second optical fiber part 31b.

In the embodiment, each of the first and second grooves 35 and 37 is defined by one or more faces. These grooves each may be made of, for example, a single curved face defining a U-shaped groove, and alternatively, can be made of, for example, two flat faces defining a V-shaped groove or three flat faces defining a rectangular groove. The shapes of the first groove 35 and the second groove 37 are not limited to those in the embodiment.

Figure 5:
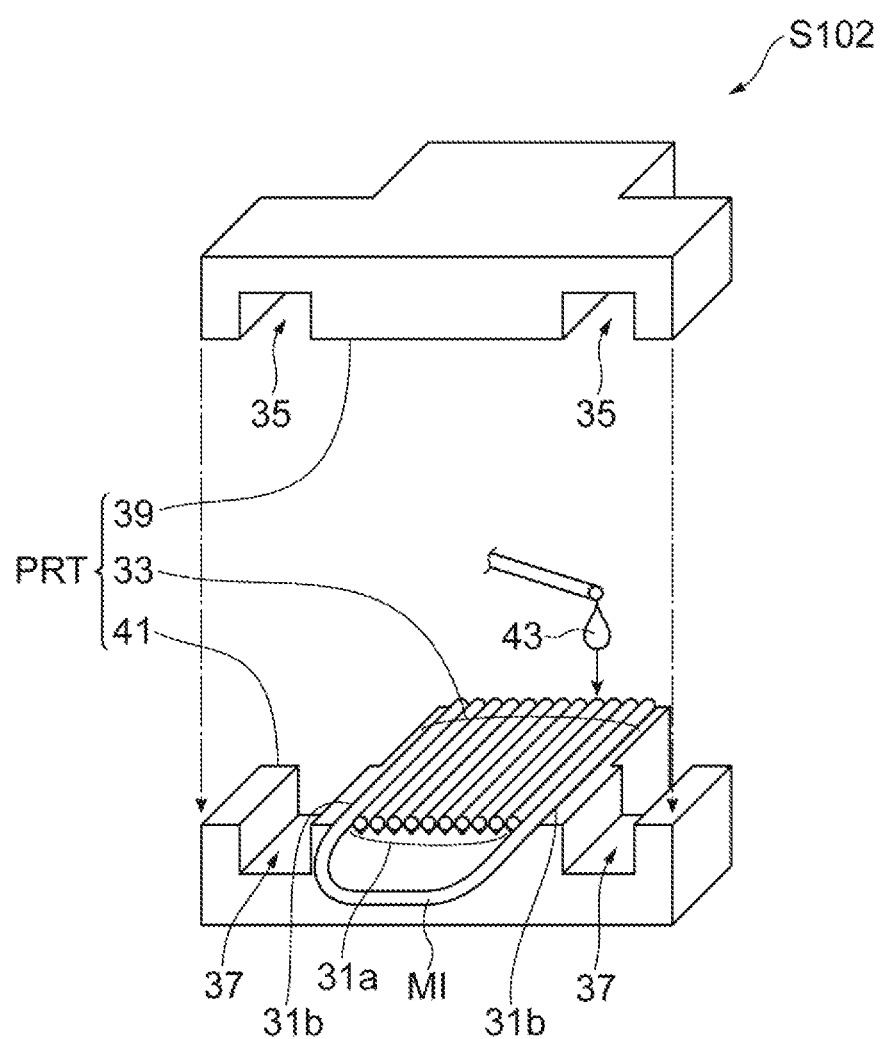
FIG. 5 is a schematic view showing a major step in the method according to the present embodiment.

As shown in FIG. 5, in step S102, in order to fix the first and second optical fiber parts 31a and 31b between the first and second parts 39 and 41, the optical fiber part 33, the first and second parts 39 and 41 are aligned with each other. Specifically, the first and optical fiber parts 31a and 31b are arranged between the first and second parts 39 and 41. After or prior to this arrangement, an adhesive material 43 is applied to the first and optical fiber parts 31a and 31b and the first and second parts 39 and 41 so as to avoid the first and second grooves 35 and 37. The adhesive material 43, which has not been solidified, is not disposed in the first and second grooves 35 and 37 of the first and second parts 39 and 41. The adhesive material 43 thus supplied is cured to fix the first and second optical fiber parts 31a and 31b to the first and second parts 39 and 41. The adhesive material 43 can be, for example, a resin containing an ultraviolet curing agent and/or a thermal curing agent. For example, the first and second optical fiber parts 31a and 31b are aligned with the second part 41 to form the arrangement of the first and second optical fiber parts 31a and 31b on the second part 41. The first part 39 is put on the arrangement of the optical fiber part 33 and the second part 41. The first and second parts 39 and 41 are aligned such that the first groove 35 and the second groove 37 can form a through hole, such as the through hole 17d. In the present embodiment, the length of the second optical fiber part 31b is larger than that of each of the first optical fiber parts 31a. The first and second optical fiber parts 31a and 31b are fixed to the first and second parts 39 and 41 such that the first optical fiber part 31a and the first and second end portions of the second optical fiber part 31b are disposed between the first and second parts 39 and 41 and the intermediate portion MI adjoins the first and second end portion outside the first and second parts 39 and 41. In the arrangement of the first and second optical fiber parts 31a and 31b, the first and second end portions of the second optical fiber part 31b, which are positioned to the second part 41, are optically coupled to each other through the intermediate portion MI, which extends outside the first and second parts 39 and 41. The second optical fiber part 31b is disposed such that the arrangement of the first optical fiber parts 31a is located between the first and second end portions of the second optical fiber part 31b, whereby the first and second end portions of the second optical fiber part 31b are adjacent to respective outermost first optical fiber parts among the first optical fiber parts 31a arranged. The arrangement of the first and second optical fiber parts 31a and 31b is not limited to that in the present embodiment.

Figure 6A:
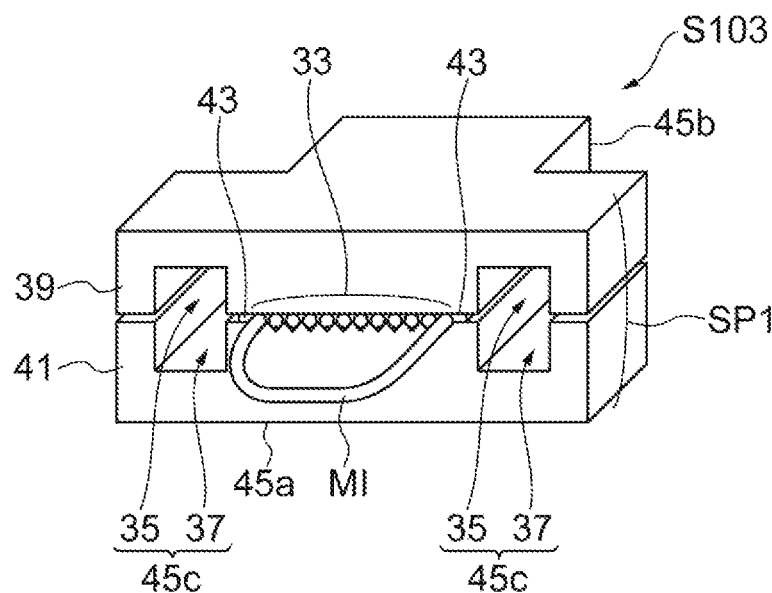
FIG. 6A is a schematic view showing a major step in the method according to the present embodiment.

As shown in FIG. 6A, in step S103, the first and second optical fiber parts 31a and 31b are fixed between the first and second parts 39 and 41 to be held by the first and second parts 39 and 41. Specifically, the adhesive material 43 is cured to secure the first and second optical fiber parts 31a and 31b to the first and second parts 39 and 41, thereby forming a first product SP1. The first product SP1 has a first end face 45a, a second end face 45b and a through hole 45c. The second end face 45b is on the opposite side of the first end face 45a, and the second optical fiber part 31b extends from first end face 45a. The through hole 45c is defined by the adhesive material 43 thus cured and the first and second grooves 35 and 37 of the first and second parts 39 and 41. The adhesive material 43 solidified does not protrude into the through hole 45c.

Figure 6B:
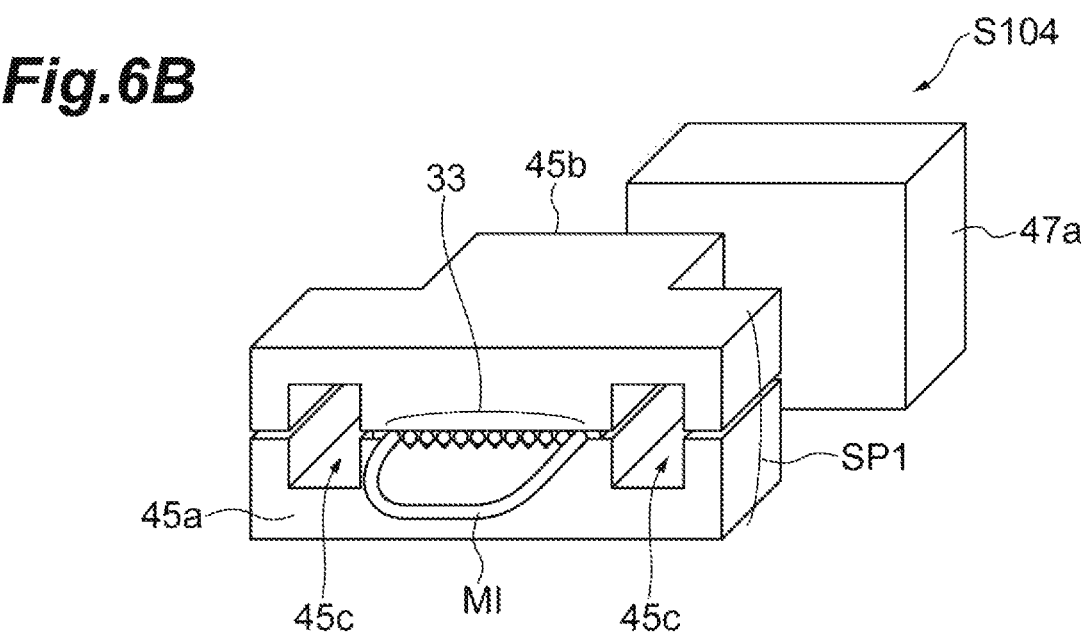
FIG. 6B is a schematic view showing a major step in the method according to the present embodiment.

As shown in FIG. 6B, in step S104, polishing the first product SP1 can provide the first product SP1 with an optical coupling face. Specifically, the second end face 45b of the first product SP1 is polished using the polishing apparatus 47a to form a polished second end face 45b. This polishing is applied to the first product SP1, which has the intermediate portion MI of the second optical fiber part 31 on the first end face 45a.

FIG. 7A is schematic view showing a polished first product SP1. FIGS. 7B, 7C and 7D are side views, depicted in the directions of Arrows B, C and D shown in FIG. 7A, respectively, each showing the first product SP1. The second end face 45b thus polished is simply referred to as a polished end face 45d. The polishing end face 45d has such flatness as to be optically coupled to an optical connector. The polished first product SP1 has, at the front end, the arrangement of the ends of the first optical fiber parts 31a and the intermediate portion MI of the second optical fiber part 31b. If necessary, the first product SP1 can be provided with a rear end face 45e at the rear end thereof. In the present embodiment, the first product SP1 has not only the polishing end face 45d but also the rear end face 45e, and the rear end of the first product SP1 is provided with the rear end face 45e that is recessed with respect to the polishing end face 45d.

As shown in FIG. 8A, in step S105, an optical connector tool TOOL is prepared, and the optical connector tool TOOL includes an optical connector CON and inserting components 47, which are attached to the optical connector CON. As shown in FIG. 8A, the optical connector CON includes a connector body BD and a pigtail fiber PG. The connector body BD includes an optical fiber array AR arranged at the same pitch as that of the optical fiber parts 33 in the polished first product SP1, and a first hole TH1 and a second hole TH2 for receiving inserting components 47. The interval between the first and second holes TH1 and TH2 is associated with the distance between the through holes 45c of the polished first product SP1. As shown in FIG. 8A, the inserting components 47, each of which has the shape of a pin shown in FIG. 8B, and are assembled with the optical connector CON by being inserted into the first and second holes TH1 and TH2, thereby obtaining the optical connector tool TOOL that has the inserting components 47 in a pluggable manner. The inserting components 47 each include a guide pin, and the inserting components 47 each of which has the shape of a guide pin will be given to the optical connecting device. The guide pin GPN may has a length larger than that of the optical connector CON, and may be larger than the sum of the lengths of the polished first product SP1 and the optical connector CON. The guide pin GPN has such a length as to allow the inserting components 47 to be inserted into or pass through the through holes 45c of the polished first product SP1. Alternatively, guide pins GPN are attached to the first and second holes TH1 and TH2 to form the optical connector CON, and the inserting components 47, each of which has the shape of a guide pipe shown in FIG. 8C, are assembled with this optical connector CON by being attached to the guide pins GPN, thereby obtaining the optical connector tool TOOL that has the inserting components 47 in a pluggable manner. The guide pins GPN each have a length larger than that of the optical connector CON. The guide pin GPN has such a length as to allow the inserting components 47 to be inserted into or pass through the through holes 45c of the polished first product SP1.

As shown in FIGS. 9A and 9B, in step S106, the inserting components 47 of the optical connector tool TOOL are inserted into the through holes 45c of the polished first product SP1 such that the optical connector tool TOOL makes contact with the polished first product SP1 at the polished end face 45d thereof, thereby forming a preliminary connection between the polished first product SP1 and the optical connector tool TOOL. Each of the inserting components 47 is apart from the inner side face of the through hole 45c of the polished first product SP1 that is preliminarily connected with optical connector tool TOOL. The through hole 45c has dimensions designed to allow one of the polished first product SP1 and the optical connector tool TOOL to move relatively with respect to the other in the subsequent optical alignment.

Figure 10:
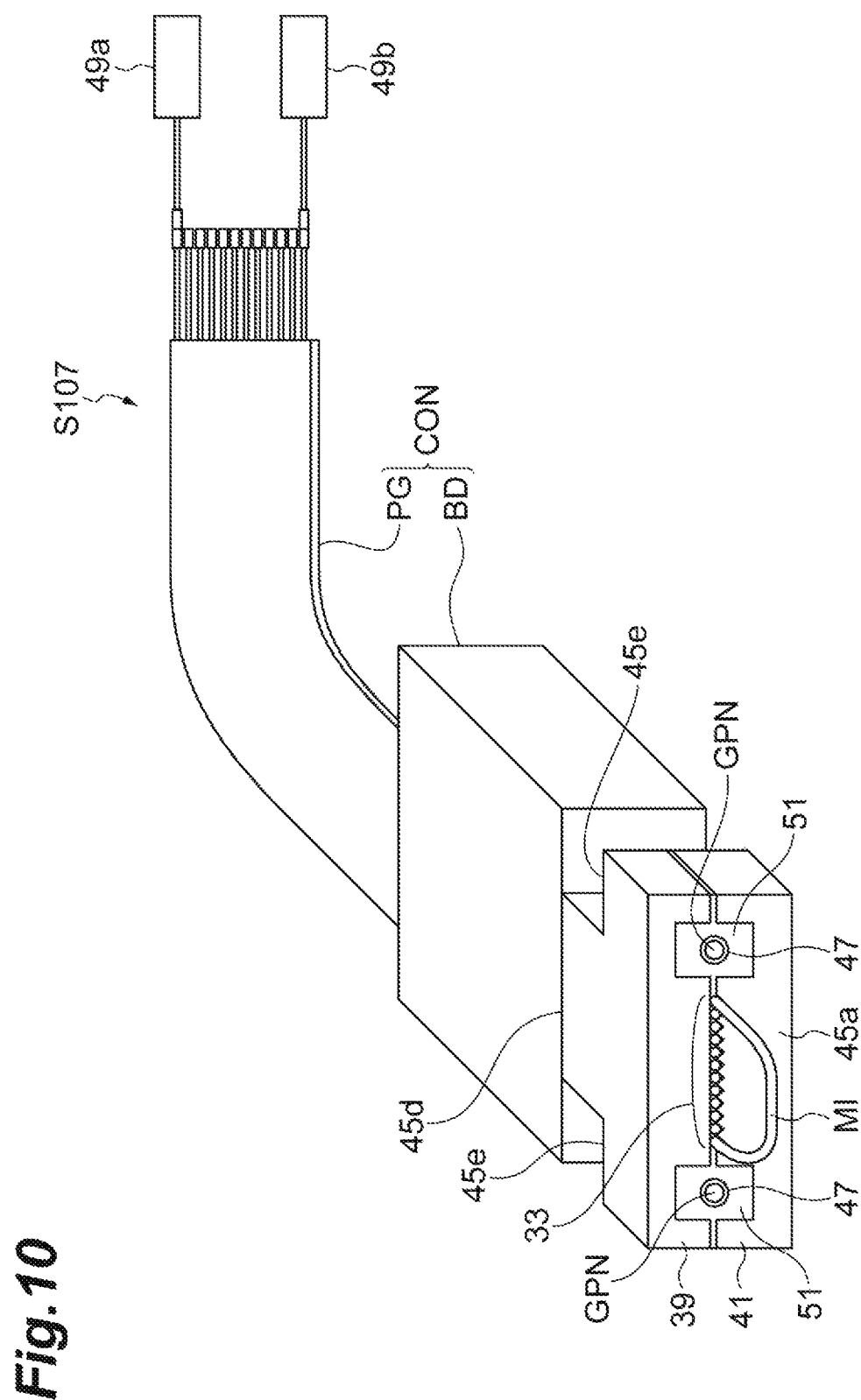
FIG. 10 is a schematic view showing a major step in the method according to the present embodiment.

As shown in FIG. 10, in step S107, after the preliminary connection of the polished first product SP1 and the optical connector tool TOOL, resin 51 is supplied to the through hole 45c of the polished first product SP1 with the preliminary connection maintained. The inserting component 47 of the optical connector tool TOOL thus preliminarily-connected has already been disposed in the through hole 45c of the polished first product SP1, and uncured resin 51 has been supplied to the polished first product SP1 to fill a gap between disposed between the inner face of the through hole 45c and the inserting component 47. Curing the resin 51 between the inner face of the through hole 45c and the outer face of the inserting component 47 can make the inserting component 47 apart from the first and second parts in the through hole 45c, so that the cured resin 51 can prevent the side face of the inserting component 47 from making contact with the inner face of the through hole 45c. The first product SP1 is provided with both the rear end face 45e and the polishing end face 45d at the rear end thereof. The rear end face 45e is recessed with respect to the polishing end face 45d. The rear end has a difference in level between the rear end face 45e and the polishing end face 45d. This difference in level prevents an excess resin for the resin 51 in the through hole 45c from reaching the optical connector tool TOOL. Prior to or after supplying the resin 51 to the inserting component 47 in the through hole 45c, the optical connector tool TOOL is connected to an optically-aligning device. Specifically, the optical connector tool TOOL, which is preliminarily connected to the polished first product SP1 at the polished end face 45d, has first and second optical waveguides, and the first and second optical waveguides can be optically coupled to the first and second end portions of the second optical fiber part 31b in the polished first product SP1. The first and second optical waveguides in the optical connector tool TOOL are connected to respective optical devices, such as a light source 49a and a light receiving device 49b.

The first product SP1 that has the first optical fiber parts 31a of the optical fiber part 33 without the second optical fiber part 31b uses two first optical fiber parts among the first optical fiber parts 31a to be optically coupled to the first and second optical waveguides through an optical alignment. Specifically, the first and second optical waveguides are connected to one of the light source 49a and the light receiving device 49b at the one ends thereof, and the two first optical fiber parts 31a in the first product SP1 are optically connected to the other of the light source 49a and the light receiving device 49b at the other ends thereof.

Figure 11:
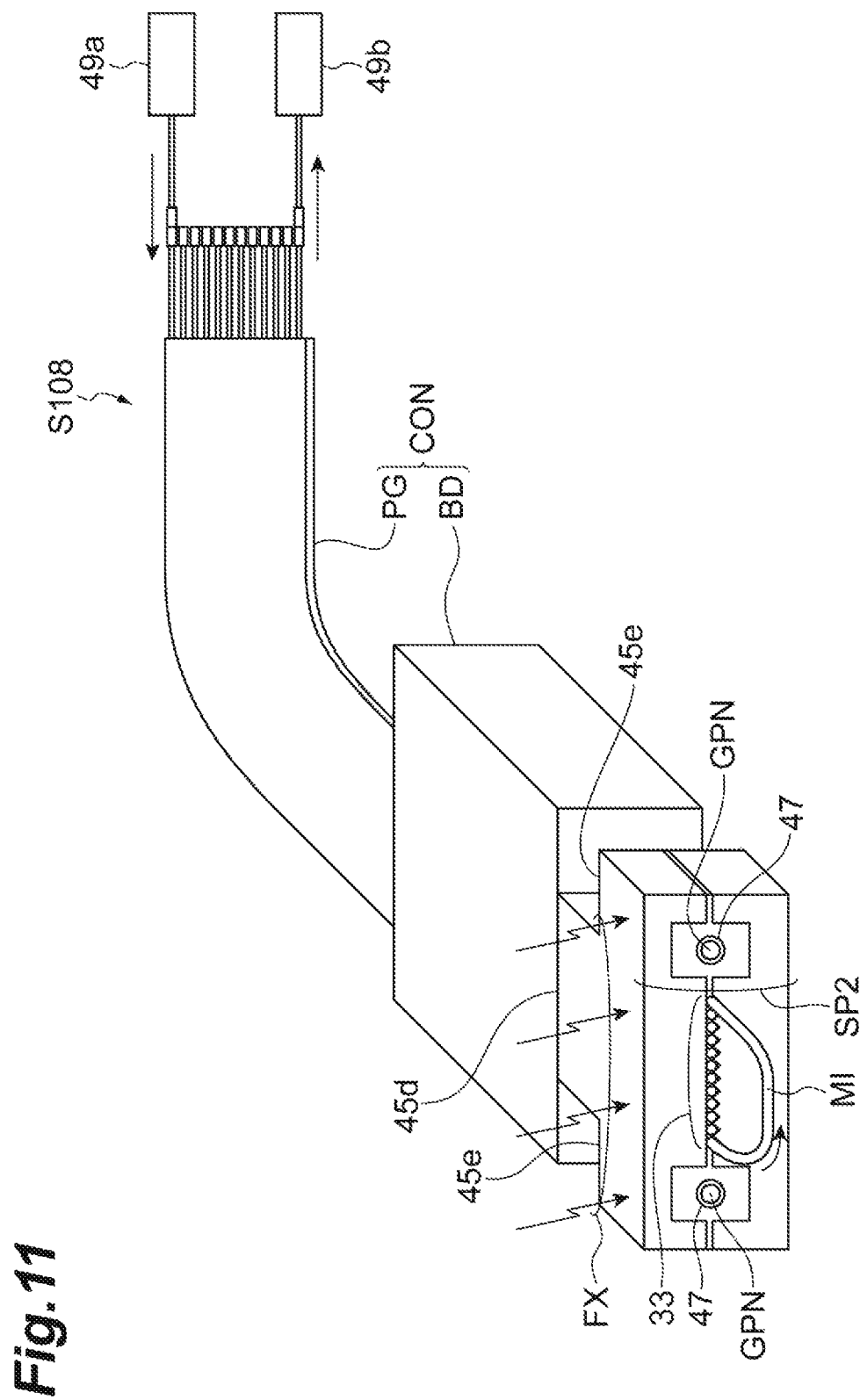
FIG. 11 is a schematic view showing a major step in the method according to the present embodiment.

As shown in FIG. 11, in step S108, the inserting component 47 of the optical connector tool TOOL is positioned to the polished first product SP1 in the through hole 45c. In the polished first product SP1 preliminarily-connected to the optical connector tool TOOL, the resin 51 and the inserting component 47 are already provided in the through hole 45c, and the resin 51 fills in between the inner face of the through hole 45c and the outer face of the inserting component 47. The preliminary connection between the polished first product SP1 and the optical connector tool TOOL makes the optical alignment of the inserting component 47 easy. More specifically, one of the optical connector tool TOOL and the first product SP1 that are preliminarily-connected to each other is moved relative to the other to make optical coupling which connects the first and second optical waveguides of the optical connector tool TOOL with the first and second end portions of the second optical fiber part 31b in the polished first product SP1, respectively. The success of the optical alignment causes a light beam from the light source 49a to reach the light receiving device 49b through the optical connector tool TOOL, the polished first product SP1 and the optical connector tool TOOL in order, specifically through the first optical waveguide of the optical connector tool TOOL, the second optical fiber part 31b including the first end portion, the intermediate portion, and the second end portion, and the second optical waveguide of the optical connector tool TOOL.

In the first product SP1 that has the first optical fiber parts 31a without the second optical fiber part 31b, the success of the optical alignment causes light beams from the light source 49a to travel only in one way to the light receiving device 49b through the optical connector tool TOOL and the first product SP1 in order, specifically through the first and second optical waveguides of the optical connector tool TOOL and the two first optical fiber parts 31a in the first product SP1. Alternatively, the success of the optical alignment causes light beams from the light source 49a to travel only in one way to the light receiving device 49b through the first product SP1 and the optical connector tool TOOL in order, specifically through the two first optical fiber parts 31a in the first product SP1 and the first and second optical waveguides of the optical connector tool TOOL. If necessary, the first optical fiber parts 31a are provided with one ends connected to the first and second optical waveguides of the optical connector tool TOOL, and other ends optically coupled to each other via another optical waveguide.

The polishing end face 45d protrudes from the rear end face 45e, which is set back far from the optical coupling face of the optical connector CON, in a direction from the front end to the rear end to form a protruding portion. This protrusion ensures the separation between the rear end face 45e and the optical coupling face of the optical connector CON, and prevents uncured resin for the resin 51 in the through hole 45c from reaching the optical connector CON. In order to provide this separation, the optical connector CON may be provided with a difference in level in the rear end of the optical connector CON, and has a partial face, which is set back far from the optical coupling face of the optical connector CON, at the rear end thereof to form the level difference.

The protruding portion of the rear end is provided with the polishing end face 45d, which is apart from the rear end face 45e in the direction the rear end to the front end, and the protruding portion allows an uncured resin for the resin 51, supplied to the through hole 45c, to be apart from the polishing end face 45d in the active alignment. The success of the active alignment brings the positioning of the inserting component 47 in the through hole 45c to completion. Making the distance between the first and second portions of the second optical fiber part 31b in the first product SP1 large can provide the first product SP1 with high accuracy in the positioning of the inserting component 47. As seen from the above description on the active alignment, the position of the inserting component 47 is determined independently of the dimensional precision of the supporting portions in the first and second parts 39 and 41. After the active alignment, the resin 51 is solidified with the preliminary connection maintained, thereby forming the first resin body 14 (the solidified resin 51). Solidification of the resin 51 is performed by a treatment FX of, for example, ultraviolet irradiation and/or heating. The first resin body 14 holds the inserting component 47 such that the inserting component 47 does not make direct contact with the inner face of the through hole 45c in the polished first product SP1. The first resin body 14 can reinforce the fixation of the adhesive material 43 between the first and second parts 39 and 41. These steps can fix the inserting component 47, which is positioned in the through hole 45c, to the polished first product SP1 with resin to form a second product SP2.

This method uses active alignment in order to position the inserting component 47, which is attached to the optical connector CON, in the through hole 45c of the first product SP1. The inserting component 47 between the first and second parts 39 and 42 is positioned independently of the first groove 35 of the first part 39 and the second groove 37 of the second part 41. This positioning allows the first resin body 14 to cover the entire outer side face of the inserting component 47 with the resin 51 in the longitudinal direction of the through hole 45c.

Figure 12A:
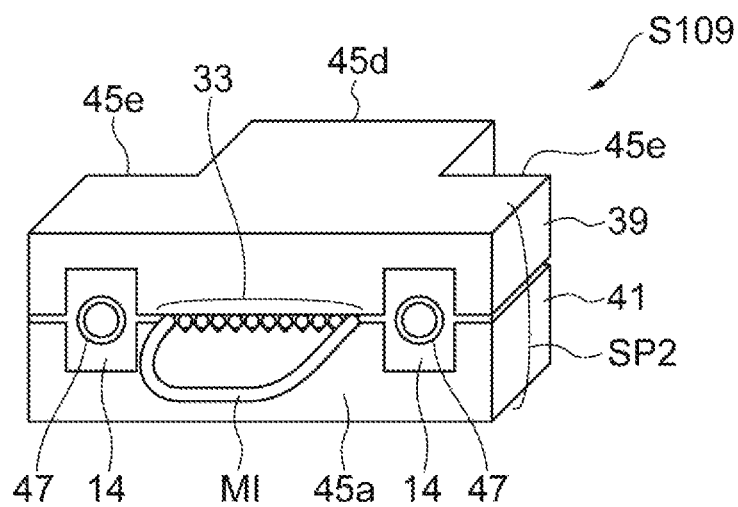
FIG. 12A is a schematic view showing a major step in the method according to the present embodiment.

As shown in FIG. 12A, in step S109, the optical connector CON is removed from the second product SP2 to release the optical coupling. The fixation with the resin allows the inserting component 47, which belongs to the optical connector tool TOOL before the alignment, to be left in the second product SP2. The second product SP2 still has an intermediate portion MI of the second optical fiber part 31b, which form a bridge outside the first and second parts 39 and 41. The polishing end face 45d distant from the rear end face 45e can easily separate the second product SP2 from the optical connector CON of the optical connector tool TOOL.

Figure 12B:
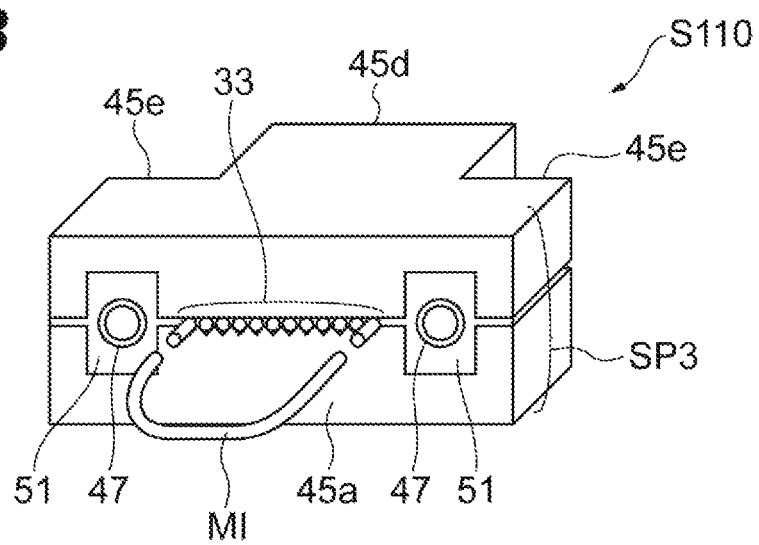
FIG. 12B is a schematic view showing a major step in the method according to the present embodiment.

As shown in FIG. 12B, in step S110, the second product SP2 is processed so as to remove the intermediate portion MI of the second optical fiber part 31b from the second product SP2, such that the first and second end portions of the second optical fiber part 31b, which are disposed between the first and second parts 39 and 41, are left in the second product SP2, thereby producing a third product SP3 from the second product SP2.

Figure 12C:
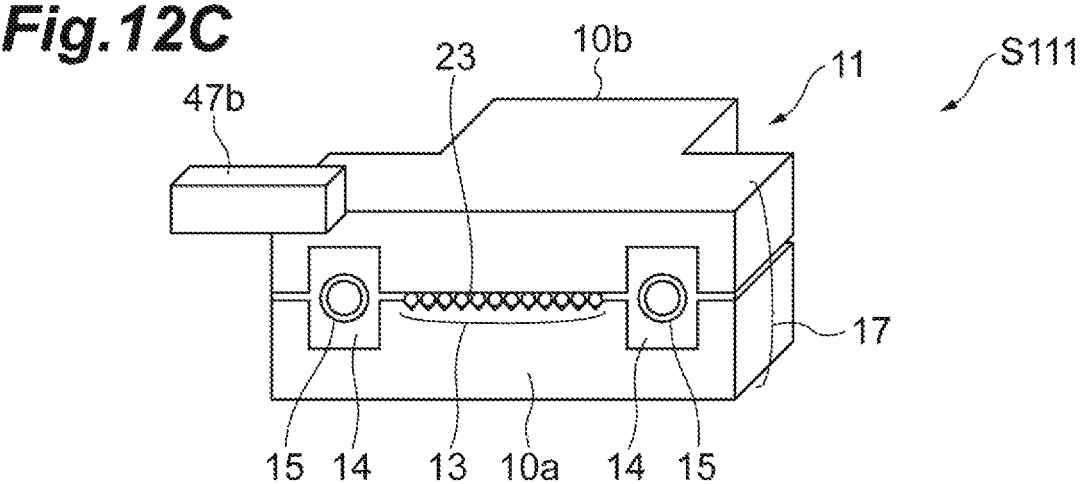
FIG. 12C is a schematic view showing a major step in the method according to the present embodiment.

As shown in FIG. 12C, in step S111, the first end face 45a of the third product SP3 is polished with the polishing apparatus 47b to form the optical coupling end face. Removing the intermediate portion MI of the second optical fiber part 31b from the second product SP2 by this polishing can provide the optical connecting device 11 with the optical coupling end face (one end face 10a of the optical connecting device 11).

This fabricating method can align the inserting component 47 in the through hole 45c with the optical fibers without supporting the inserting component 47 through direct contact with the inner face of the through hole 45c to position the inserting component 47, so that the position of the inserting component 47 thus aligned is independent from the positions, precisions and shapes of the inner faces of the through hole 45c. The inserting component 47 fixed in the through hole 45c with the resin 51, which separates the inserting component 47 from the side face of the through hole 45c in the optical connecting device 11, is used to connect an external optical connector to the optical connecting device 11. The resin between the inserting component 47 (the guide member 15) and the first and second parts 39 and 41 of the holder 17 prevents thermal deformation, which temperature variations may cause, in one of the inserting component 47 (the guide member 15) and the first and second parts 39 and 41 of the holder 17, from exerting stress directly on the other.

Figure 13A:
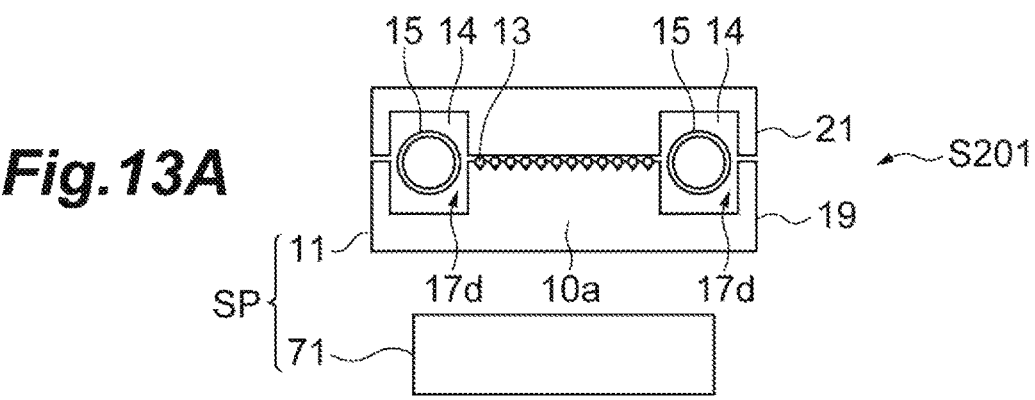
FIG. 13A is a schematic view showing a major step in the method according to the present embodiment.
Figure 13B:
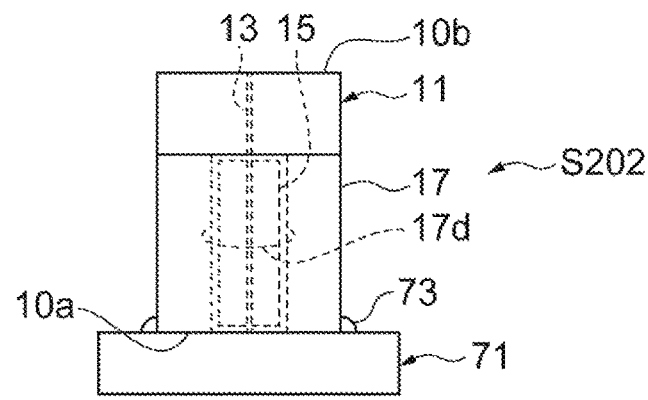
FIG. 13B is a schematic view showing a major step in the method according to the present embodiment.
Figure 13C:
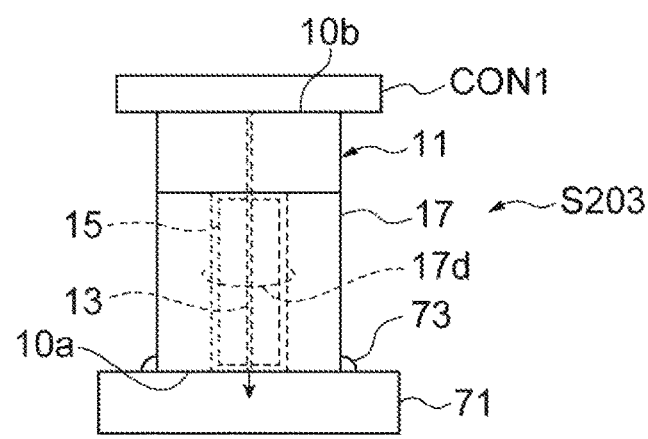
FIG. 13C is a schematic view showing a major step in the method according to the present embodiment.

FIGS. 13A, 13b and 13C are schematic views each showing a major step in a method of making an assembly for a light processing apparatus. As shown in FIG. 13A, in step S201, for example, an optical connecting device 11 is prepared, and a semiconductor device 71 is prepared which includes optical coupling elements. The semiconductor device 71 may include a semiconductor optical device, such as a silicon photonics device. The optical connecting device 11 and the semiconductor device 71 are referred to hereinafter as a part SP.

As shown in FIG. 13B, in step S202, the optical connecting device 11 is mounted on the semiconductor device 71 such that the optical connecting device 11 is optically coupled to the optical coupling elements in the semiconductor device 71. Further, a resin 73 is disposed on the semiconductor device 71.

As shown in FIG. 13C, in step S203, the optical connector CON1 is connected to the optical connecting device 11 for active optical alignment. The active optical alignment can position the optical connecting device 11 to the semiconductor device 71.

As shown in FIG. 13C, after the active optical alignment, the optical connecting device 11 is fixed to the semiconductor device 71 with the resin 73 by thermosetting curing and/or ultraviolet curing. The heat treatment temperature in the thermal curing is, for example, in the range of 80 to 200 degrees Celsius, in particular, 120 degrees. The heat treatment deforms the guide member 15 and the holder 17 in accordance with respective thermal expansion coefficients. Since the guide member 15 and the holder 17 are not in direct contact with each other, one of the guide member 15 and the holder 17 thus deformed cannot further deform the other through the direct contact therebetween.

Figure 13D:
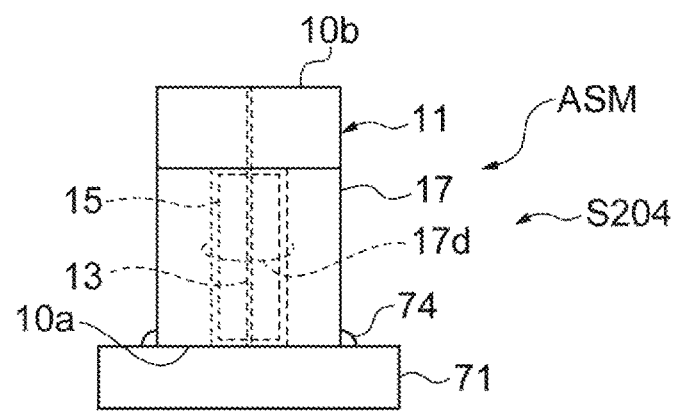
FIG. 13D is a schematic view showing a major step in the method according to the present embodiment.

As shown in FIG. 13D, in step S204, after forming the cured resin 73 (the resin body 74), the optical connector CON1 is detached from the optical connecting device 11, thereby obtaining the assembly ASM. The assembly ASM includes a semiconductor device 71 and an optical connecting device 11, and the optical connecting device 11 is optically coupled to the semiconductor device 71.

FIGS. 14A and 14B are schematic views showing an exemplary silicon photonics device for use in the optical processing apparatus according to the embodiment. FIG. 14A shows a plan view showing the silicon photonics semiconductor device, and FIG. 14B is a sectional view, taken along line XIVb-XIVb shown in FIG. 14A, showing the silicon photonic device. Referring to FIG. 14A, the silicon photonics device SIPHD includes optical coupling elements, such as grating couplers GC0, GC1, GC2, GC3, GC4, GC5, GC6, GC7, GC8, CG9, CG10, and GC11. In the embodiment, the grating couplers GC1 to CG4 are used for an optical receiver.

The optical circuit WC delivers signal light beams from the grating couplers GC1 to CG4 to the light receiving elements PD. In the present embodiment, the optical circuit WC includes the optical waveguides WG1 to WG4. Specifically, the grating couplers GC1 to CG4 are optically coupled to the photodiodes PD1 to PD4 through the optical waveguides WG1 to WG4, respectively. The photodiodes PD1 to PD4 are connected to an electric circuit TIA (for example, a transimpedance amplifier) via conductive lines EL1 to EL4. The electric circuit TIA enables processing (such as, current-voltage conversion, and amplification) of electric signals (for example, photocurrent) from the photodiodes PD1 to PD4 to generate an electric signal in response to the received signal light.

In addition, the grating couplers GC6 to CG10 are used for an optical transmitter. In the present embodiment, the optical waveguide WG6 delivers a laser light beam from the grating coupler GC6 to multiple optical modulators MD. The optical modulator MD includes, for example, a Mach-Zehnder modulator MZIA, MZIB, MZIC, and MZID. These Mach-Zehnder modulators MZIA to MZID receive the electric signals EM1 to EM4 from the drive circuit DRV, respectively, and generate respective modulated light beams in response to the electric signals EM1 to EM4. These modulated light beams propagate through the optical waveguides WG7 to WG10 to the grating couplers GC7 to CG10, respectively.

The silicon photonics device SIPHD includes a first portion 71a, a second portion 71b, and a third portion 71c, which are arranged in the direction of the device axis Dx. The first portion 71a has an arrangement of the grating couplers GC0 to CG11, and the grating couplers GC0 to CG11 are disposed along one edge in the first portion 71a. The second portion 71b includes optical elements, such as a semiconductor light receiving element, and an optical modulator. The third portion 71c includes an electric circuit, such as an electric circuit TIA and a drive circuit DRV.

Referring to FIG. 14B, the grating couplers GC0 to CG11 in the silicon photonic device SIPHD are connected to the optical waveguide WG.

Figure 15A:
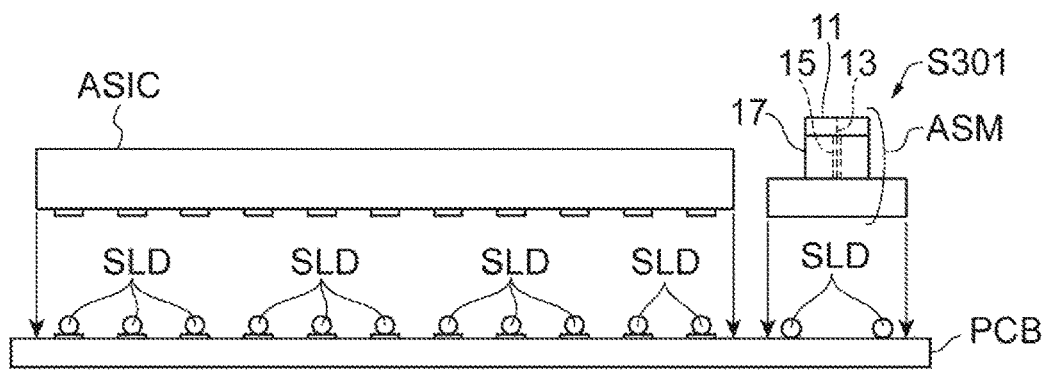
FIG. 15A is a schematic view showing a major step in the method according to the present embodiment.
Figure 15B:
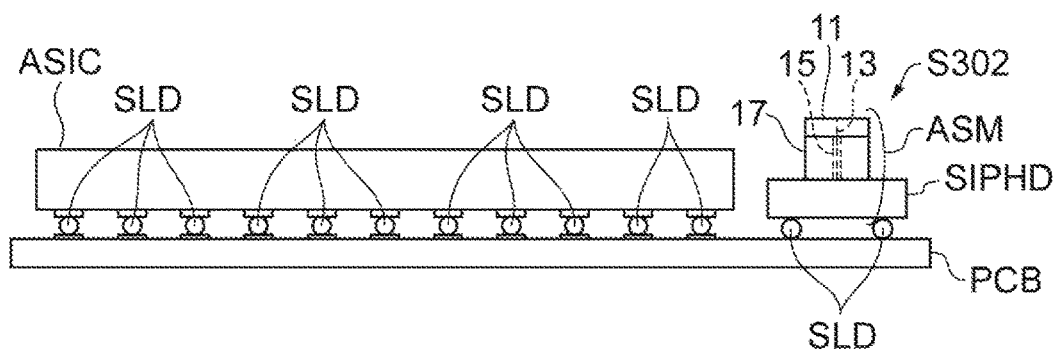
FIG. 15B is a schematic view showing a major step in the method according to the present embodiment.
Figure 15C:
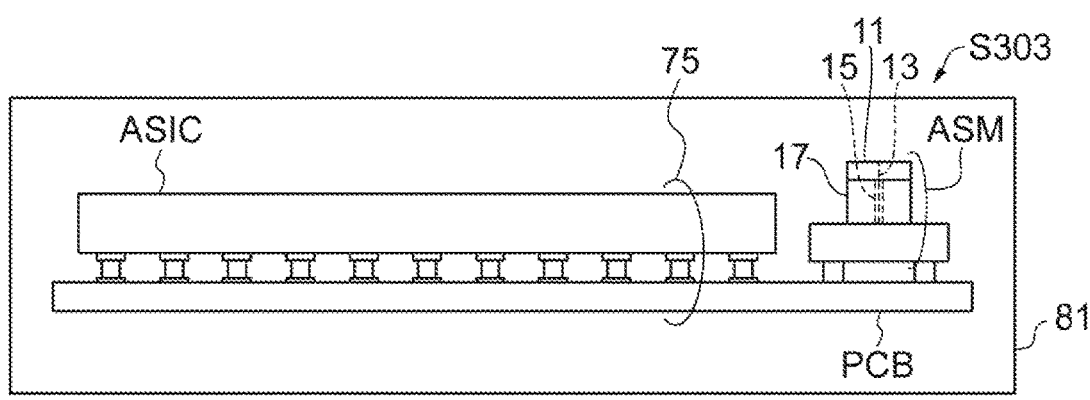
FIG. 15C is a schematic view showing a major step in the method according to the present embodiment.

FIGS. 15A, 15b and 15C are schematic views each showing a major steps in the method of making the optical processing apparatus. As shown in FIG. 13A, in step S301, an assembly ASM is prepared which includes the optical connecting device 11 and the silicon photonics device SIPHD mounting the optical connecting device 11. As shown in FIG. 15A, for example, a surface-mountable semiconductor integrated device ASIC and a wiring board PCB, such as a printed circuit board, are prepared in addition to the assembly ASM. The semiconductor integrated device ASIC includes an integrated circuit which can processes large-capacity data in a high speed. The wiring board PCB includes solder materials SLD disposed on the principal surface thereof.

As shown in FIG. 15B, in step S302, the semiconductor integrated device ASIC and the silicon photonic device SIPHD of the assembly ASM are aligned with the wiring board PCB, and the semiconductor integrated device ASIC and the assembly ASM are disposed on the wiring board PCB.

As shown in FIG. 15C, in step S303, the silicon photonic device SIPHD and the semiconductor integrated device ASIC are arranged on the wiring board PCB, and the wiring board PCB, which mounts the semiconductor integrated device ASIC and the assembly ASM that includes the silicon photonic device SIPHD and the optical connecting device 11 optically aligned with each other, is placed in a reflow apparatus 81 and subjected to heat treatment for solder reflow using the reflow apparatus 81.

The heat treatment for solder reflow is applied to the assembly ASM. The temperature of this heat treatment is, for example, in the range of 200 to 270 degrees Celsius. The reflow process heats a printed circuit board having printed solder paste thereon and a board having electrical components and solder balls thereon to complete soldering in the furnace at a temperature higher than the solder melting temperature. The assembly ASM is placed in the reflow apparatus 81. This heat treatment produces an optical processing device 75. The optical connecting device 11 of the optical processing device 75 can prevent stress from thermal deformations of the guide member 15 (the inserting component 47) and the holder 17 of the first and second members 19 and 21 from being exerted on the other. The optical connecting device 11 withstands heating in the heat treatment for solder reflow, so that the optical alignment between the optical connecting device 11 and the silicon photonics device SIPHD is maintained in the optical processing apparatus 75. The optical connecting device 11 may be placed at a temperature in the range of, for example, 40 to 100 degrees Celsius, for example, 100 degrees Celsius, in the operation of the optical processing device 75 because of the heat generation of the semiconductor device 71.

The reflow will bring the optical processing device 75 to completion.

Figure 16A:
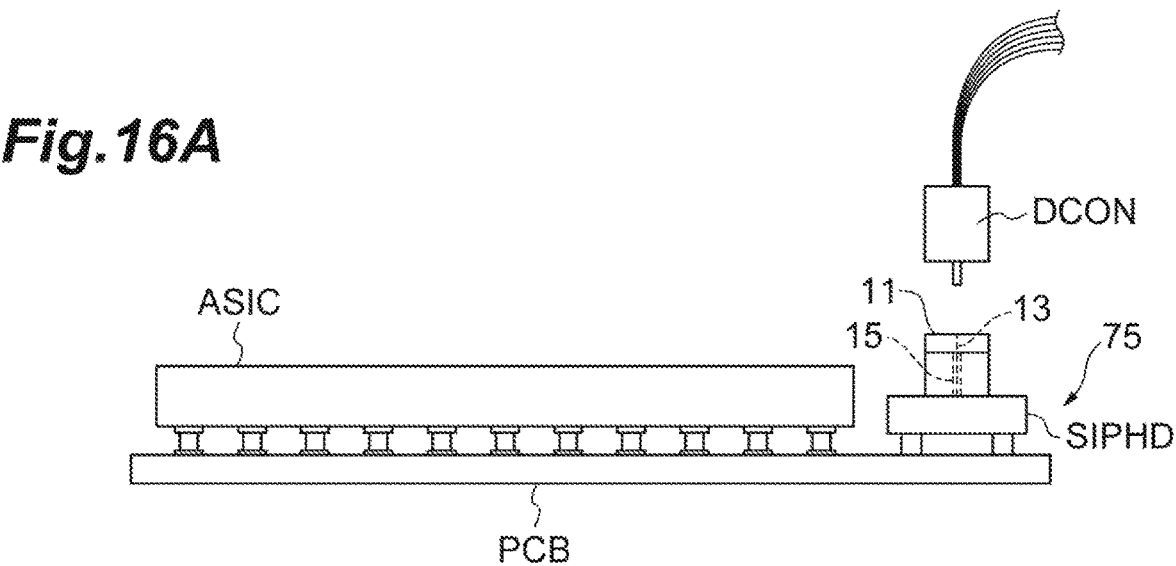
FIG. 16A is a schematic view showing a major step in the method according to the present embodiment.
Figure 16B:
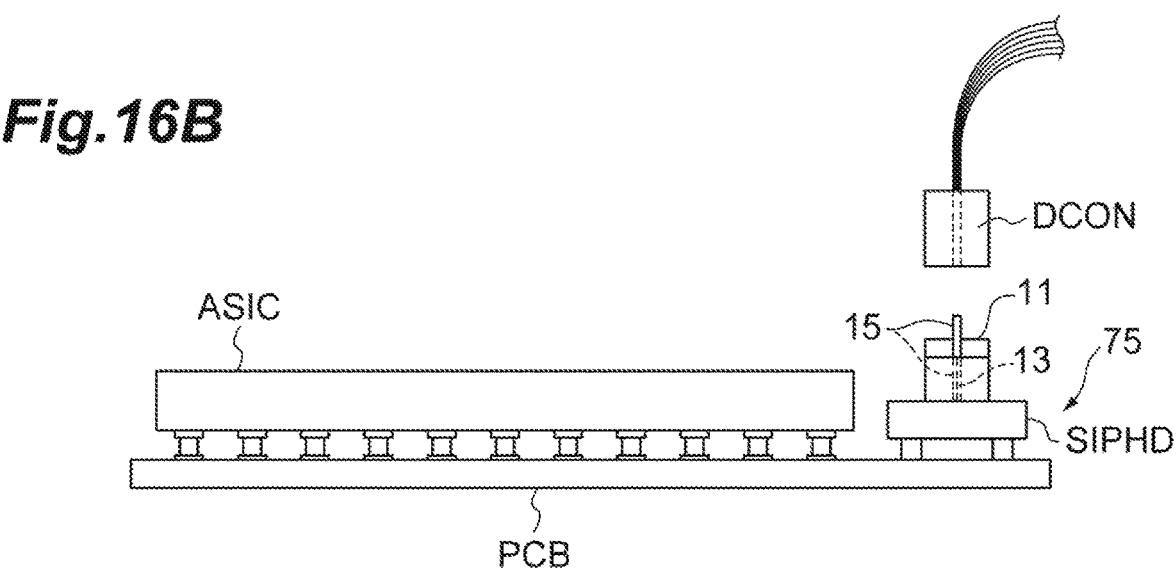
FIG. 16B is a schematic view showing a major step in the method according to the present embodiment.
Figure 16C:
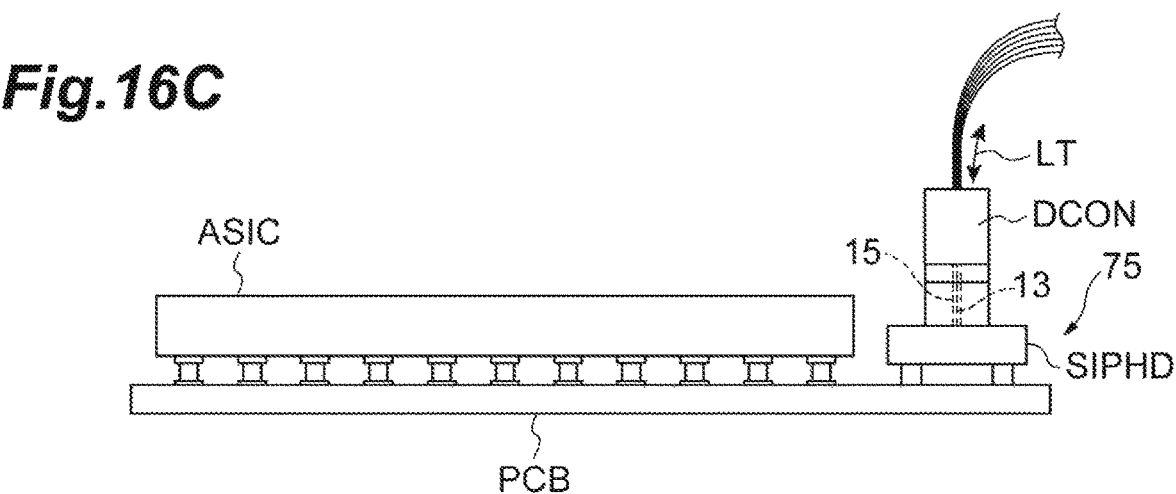
FIG. 16C is a schematic view showing a major step in the method according to the present embodiment.

FIGS. 16A to 16C are schematic views each showing an optical processing apparatus. Referring to FIG. 16A, the optical connecting device 11, which includes the guide pipe, in the optical processing device 75 is connected to an external optical connector DCON having a guide pin. Referring to FIG. 16B, the optical connecting device 11, which includes the guide rod, in the optical processing apparatus 75 is connected to an external optical connector DCON having a guide pipe. Referring to FIG. 16C, the optical connecting device 11 allows the optical processing device 75 to receive and/or provide the optical signal LT therethrough.

The optical processing device 75 is provided with the silicon photonic device SIPHD that is connected to the optical connecting device 11 of an excellent heat tolerance. The optical connecting device 11 enables passive alignment in being connected to the external optical connector DCON, so that the optical connecting device 11 can optically couple the optical connector DCOM to the silicon photonics device SIPHD in a pluggable manner. The optical connecting device 11 can withstands heating in the heat treatment for solder reflow in processes for fabricating the optical processing device 75.

The optical processing device 75 is provided with the optical connecting device 11, the silicon photonics device SIPHD, the semiconductor integrated device ASIC, and the wiring board PCB. The silicon photonics device SIPHD mounts the optical connecting device 11. The semiconductor integrated device ASIC is connected to the silicon photonics device SIPHD. The wiring board PCB mounts the silicon photonics device SIPHD and the semiconductor integrated device ASIC. The optical connecting device 11 enables easy optical coupling of the silicon photonics device SIPHD in the optical processing device 75 with an external optical component. Further, the optical connecting device 11 is provided with tolerance against thermal stress in mounting the silicon photonics device SIPHD on the optical processing device 75.

The optical connecting device 11 of a stub-type is provided with the one end face 10a and the other end face 10b for optical connection. The stub-type optical connecting device 11 allows the optical processing device 75, which includes the stub device and an optical apparatus connected thereto, to be free from handling of pigtails in assembling the optical processing device 75.

As seen from the above description, one aspect of the present embodiment provides an optical connecting device having a structure that can prevent one of thermal deformations of the holder and the inserting component from being exerted directly on the other. The further aspect of the present embodiment provides an optical processing device that includes the optical connecting device. The other aspect of the present embodiment provides a method for fabricating an optical connecting device with an inserting component separated from the holder.

Having described and illustrated the principle of the invention in a preferred embodiment thereof, it is appreciated by those having skill in the art that the invention can be modified in arrangement and detail without departing from such principles. We therefore claim all modifications and variations coining within the spirit and scope of the following claims.

What is claimed is:

1. A method for fabricating an optical connecting device comprising: a holder having a first end, a second end, and a through hole extending in a direction of an axis from one of the first end and the second end to the other; multiple optical fibers held by the holder; a guide member extending in the through hole; and a resin body separating an outer face of the guide member from an inner face of the through hole, said method comprising steps of:

preparing a first optical-fiber part, and a second optical-fiber part to provide the multiple optical fibers;

preparing a first part, and a second part to provide the holder, the first part having a first groove for a through hole providing the through hole of the holder, and the second part having a second groove for the through hole;

fixing the first part, the second part, the first optical-fiber part and the second optical-fiber part to each other to form a first product having the through hole produced from the first groove and the second groove, the first optical-fiber part and the second optical-fiber part being disposed between the first part and the second part;

preparing an optical connector tool including an optical connector, the optical connector having a first optical waveguide and a second optical waveguide, and an inserting component attached to the optical connector, positioning the inserting component of the optical connector tool in the through hole of the first product to provide the guide member; and after positioning the inserting component, fixing the inserting component to the through hole with resin to form a second product, the resin providing the resin body.

2. The method according to claim 1, wherein the first optical-fiber part has one end portion, another end portion, and an intermediate portion connecting the one end portion to the other end portion, the first optical-fiber part and the second optical-fiber part have a first length and a second length larger than the first length, respectively, the step of fixing the first part, the second part, the first optical-fiber part and the second optical-fiber part to each other includes arranging the first optical-fiber part and the second optical-fiber part between the first part and the second part such that the one end portion and the other end portion are disposed between the first part and the second part and the intermediate portion is disposed outside of the first part and the second part, and the step of positioning the inserting component includes conducting an active alignment such that the one end portion and the other end portion in the first product are optically coupled to the first optical waveguide and the second optical waveguide, respectively.

3. The method according to claim 2, further comprising a step of machining the second optical-fiber part to remove the intermediate portion from the second optical-fiber part such that the one end portion and the other end portion are left between the first part and the second part.

4. The method according to claim 1, further comprising a step of removing the optical connector from the second product.

* * * * *